(12) United States Patent
Park et al.

(10) Patent No.: US 12,308,434 B2
(45) Date of Patent: May 20, 2025

(54) FAST-CHARGING, HIGH-ENERGY, FLEXIBLE LITHIUM-SULFUR BATTERIES BASED ON HIERARCHICALLY ORDERED SULFUR PARTICLES AND PREPARATION METHOD THEREOF

(71) Applicant: POSTECH RESEARCH AND BUSINESS DEVELOPMENT FOUNDATION, Pohang-si (KR)

(72) Inventors: Moon Jeong Park, Pohang-si (KR); Han Eol Kang, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 710 days.

(21) Appl. No.: 17/553,947

(22) Filed: Dec. 17, 2021

(65) Prior Publication Data
US 2022/0407072 A1 Dec. 22, 2022

(30) Foreign Application Priority Data
Jun. 2, 2021 (KR) .................. 10-2021-0071519

(51) Int. Cl.
*H01M 4/60* (2006.01)
*C08F 230/02* (2006.01)
*H01M 4/02* (2006.01)
*H01M 10/0525* (2010.01)

(52) U.S. Cl.
CPC .......... *H01M 4/604* (2013.01); *C08F 230/02* (2013.01); *H01M 10/0525* (2013.01); *C08F 2800/20* (2013.01); *H01M 2004/021* (2013.01); *H01M 2004/028* (2013.01)

(58) Field of Classification Search
CPC ........ H01M 4/364; H01M 4/38; H01M 4/604; H01M 4/13; H01M 4/139; H01M 10/0525; H01M 10/052; C08F 230/02
See application file for complete search history.

(56) References Cited

PUBLICATIONS

JP2016053159A "Sulfur-containing polymer having ionic group" Espacenet translation (Year: 2016).*
Nature Chemistry vol. 5, pp. 518-524 (2013) "The use of elemental sulfur as an alternative feedstock for polymeric materials" (Year: 2013).*
Supplemental Information for Nature Chemistry vol. 5, pp. 518-524 (2013) "The use of elemental sulfur as an alternative feedstock for polymeric materials" (Year: 2013).*
Hu, Guangjian, et al. "A sulfur-rich copolymer@ CNT hybrid cathode with dual-confinement of polysulfides for high-performance lithium-sulfur batteries." Advanced materials 29.11 (2017): 1603835.
Hou, Ting-Zheng, et al. "Lithium bond chemistry in lithium-sulfur batteries." Angewandte Chemie 129.28 (2017): 8290-8294.

(Continued)

*Primary Examiner* — Haroon S. Sheikh
(74) *Attorney, Agent, or Firm* — LEX IP MEISTER, PLLC

(57) ABSTRACT

The present disclosure relates to a cathode active material for a secondary battery, comprising a poly(S-co-VPA) vulcanized polymer, a preparation method thereof, and a lithium-sulfur secondary battery comprising the same.

8 Claims, 27 Drawing Sheets

(56) References Cited

PUBLICATIONS

Pang, Quan, et al. "Surface-enhanced redox chemistry of polysulphides on a metallic and polar host for lithium-sulphur batteries." Nature communications 5.1 (2014): 1-8, Aug. 26, 2014.

Huang, Shaozhuan, et al. "Recent advances in heterostructure engineering for lithium-sulfur batteries." Advanced Energy Materials 11.10 (2021): 2003689.

Kang, Haneol, and Moon Jeong Park. "Thirty-minute synthesis of hierarchically ordered sulfur particles enables high-energy, flexible lithium-sulfur batteries." Nano Energy 89 (2021): 106459, Aug. 25, 2021.

* cited by examiner

[FIG. 1]
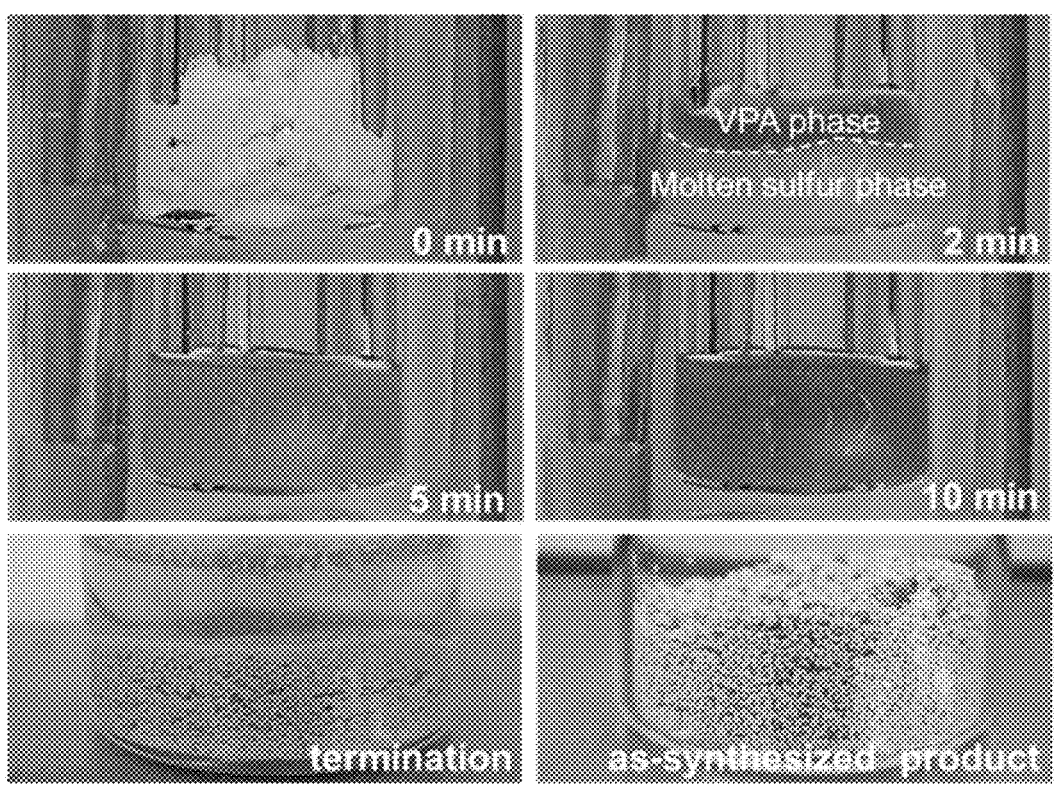

[FIG. 2A]
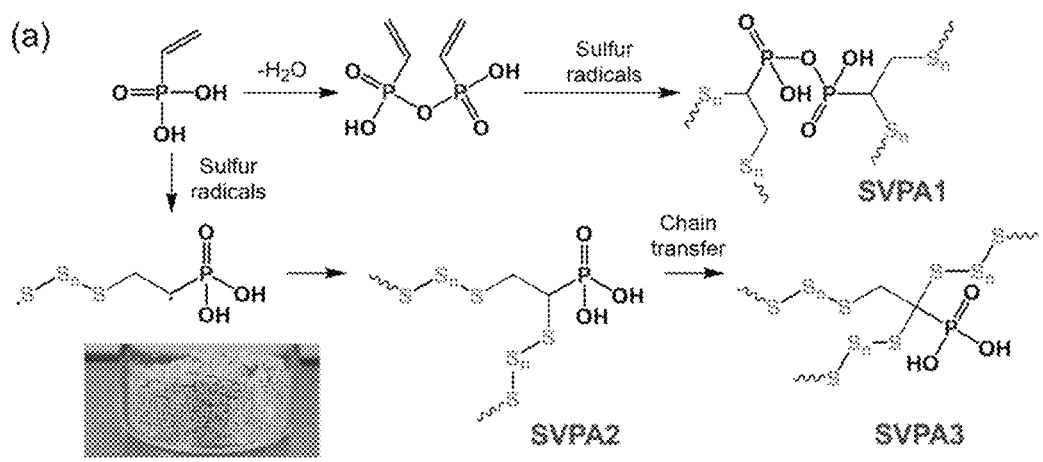
[FIG. 2B]
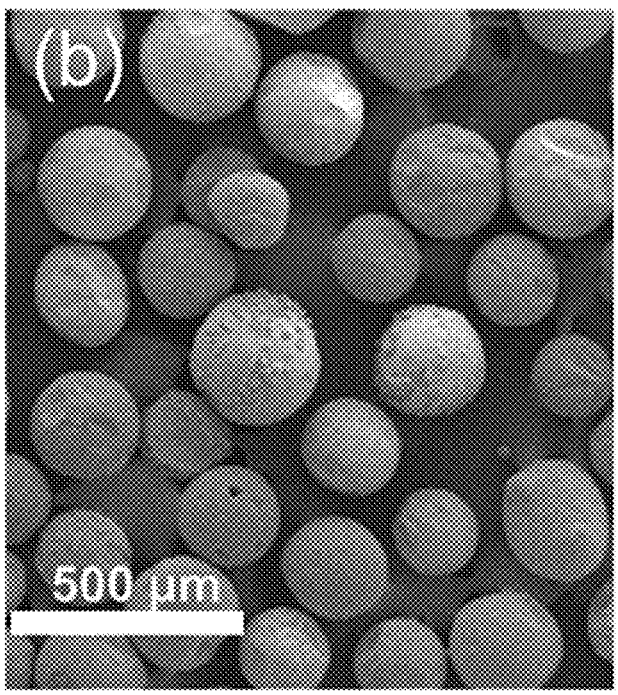

[FIG. 2C]
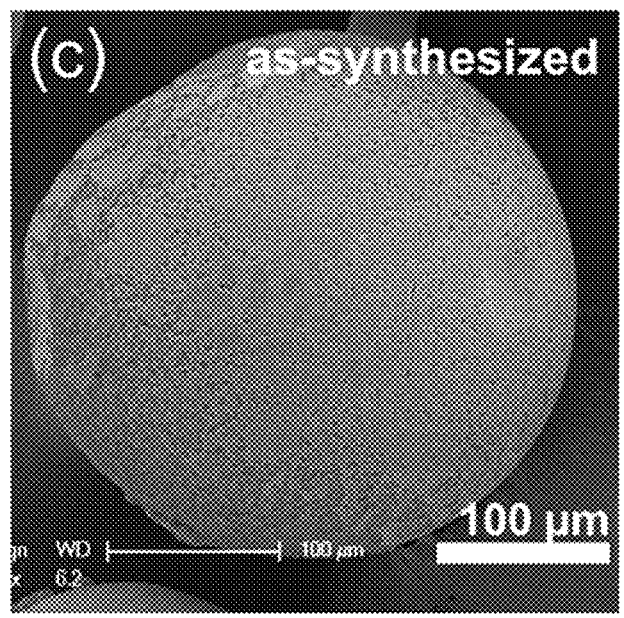
[FIG. 2D]
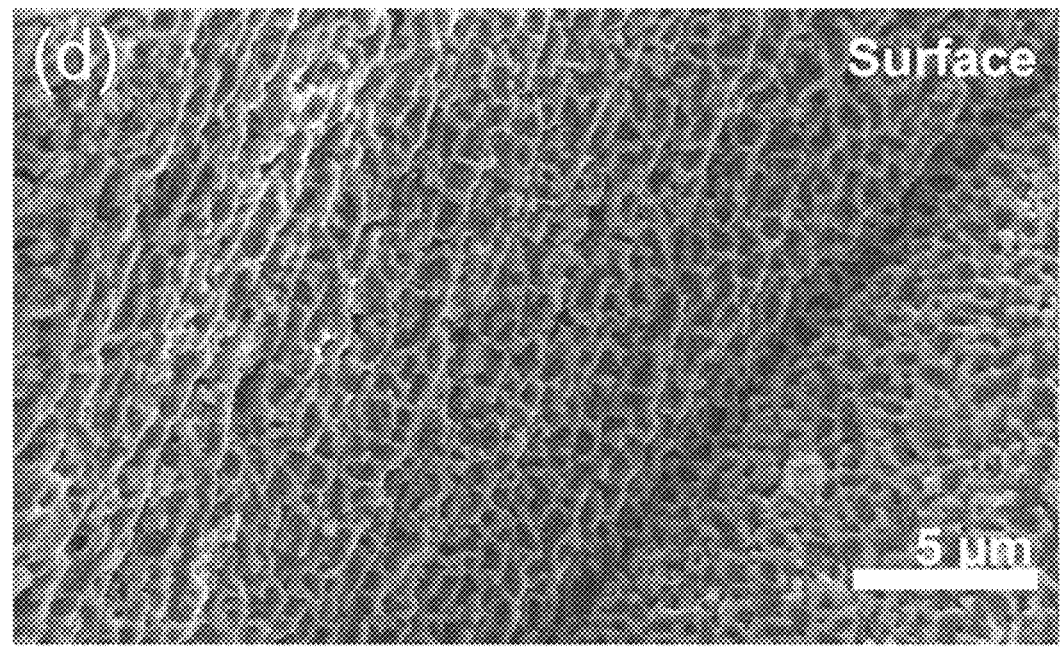

[FIG. 2E]
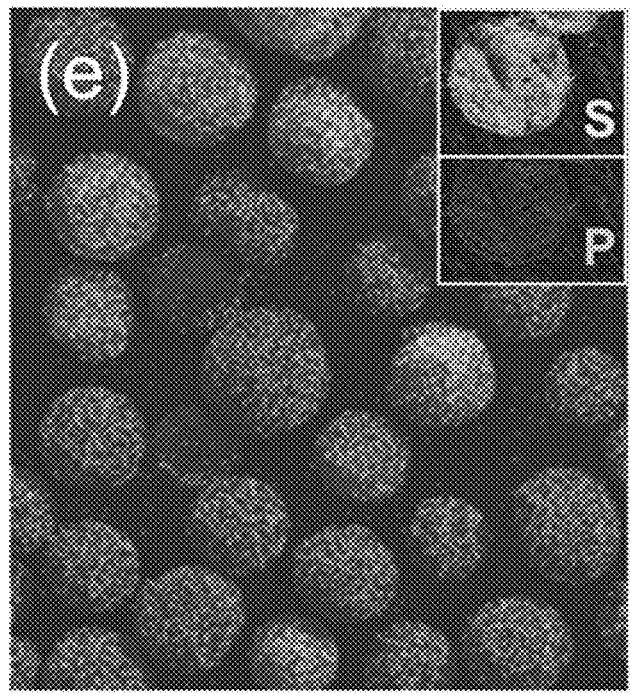
[FIG. 2F]
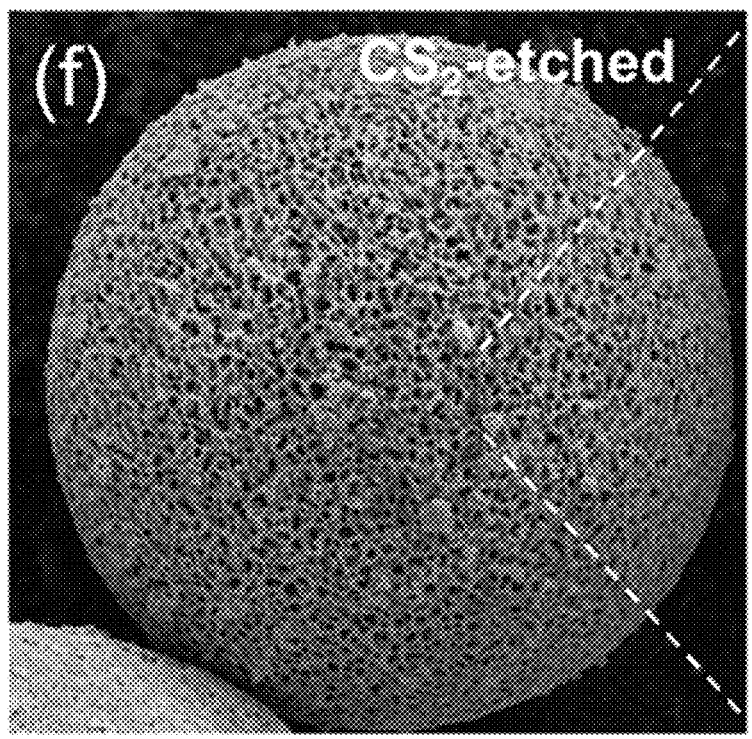

[FIG. 2G]
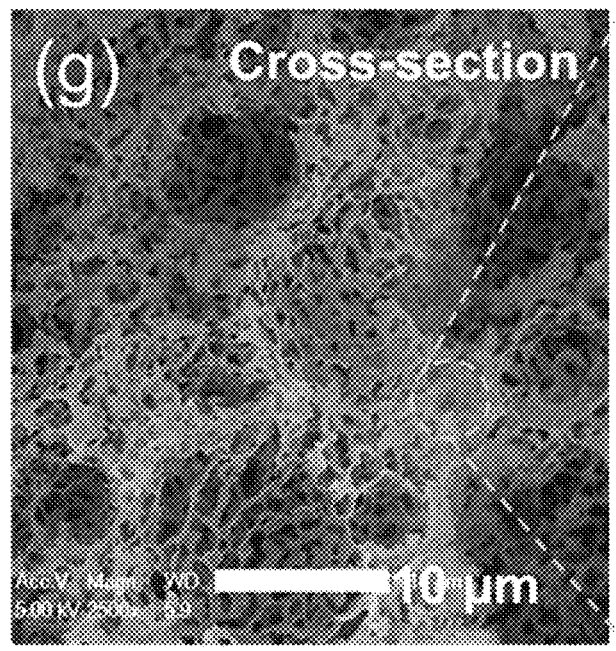
[FIG. 2H]
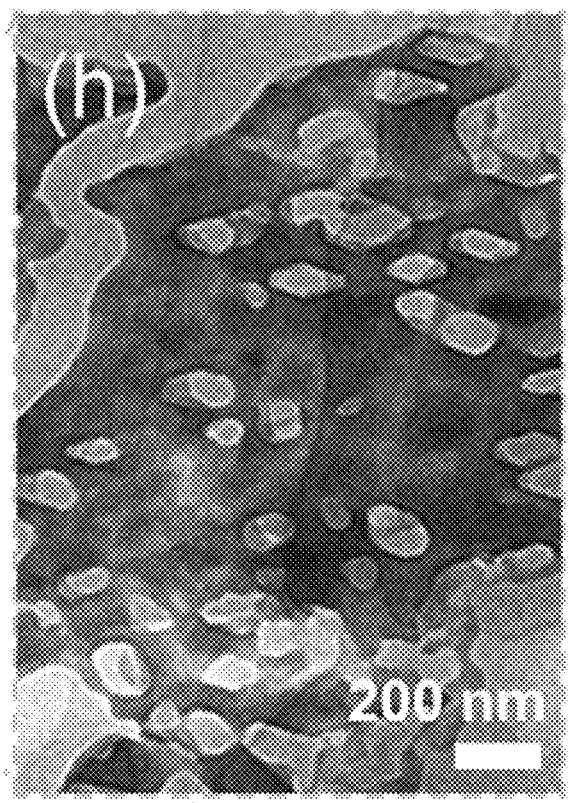

[FIG. 3]
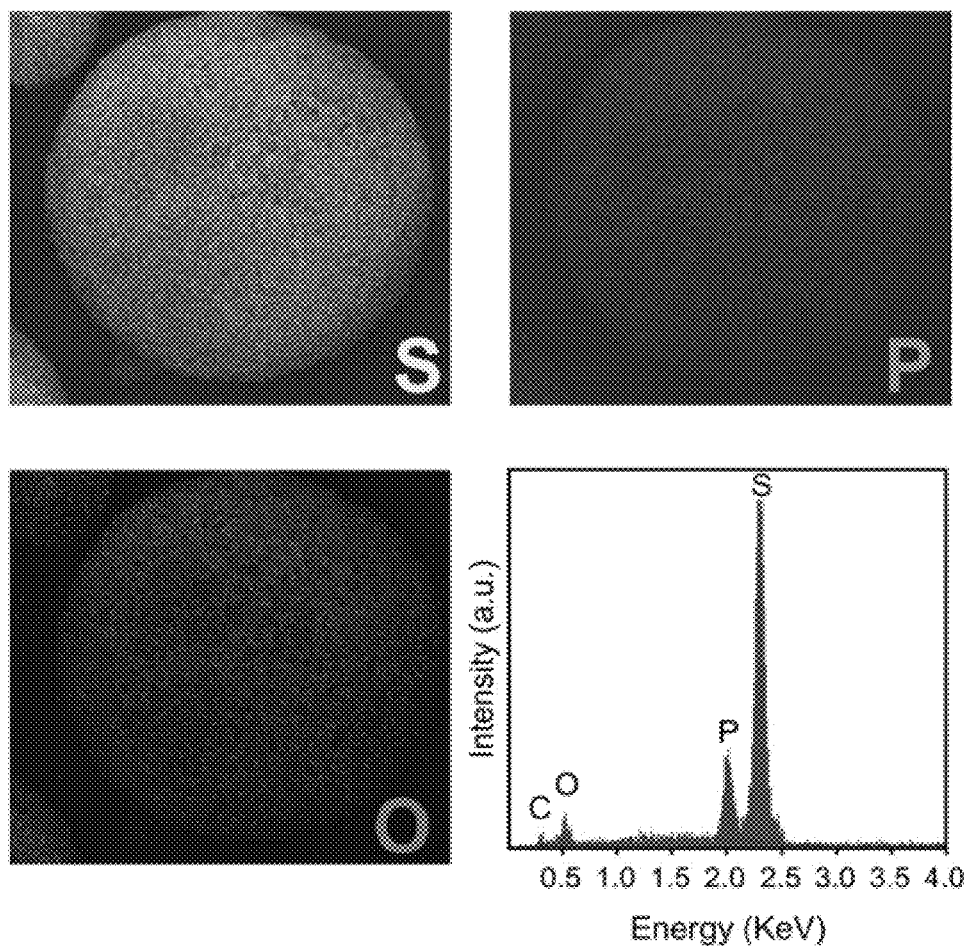

[FIG. 4A]
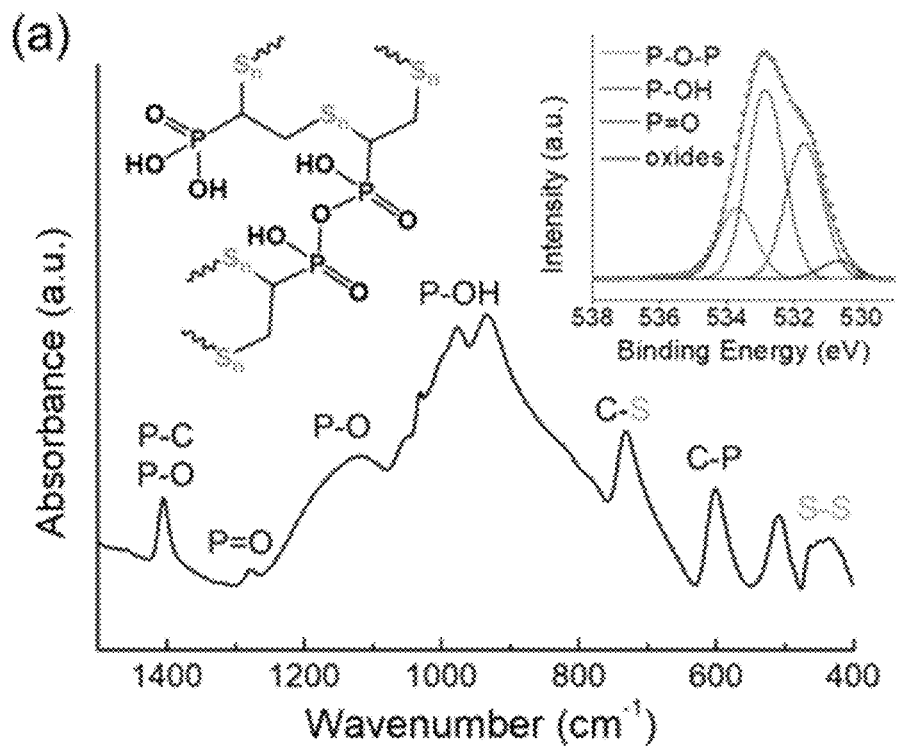
[FIG. 4B]
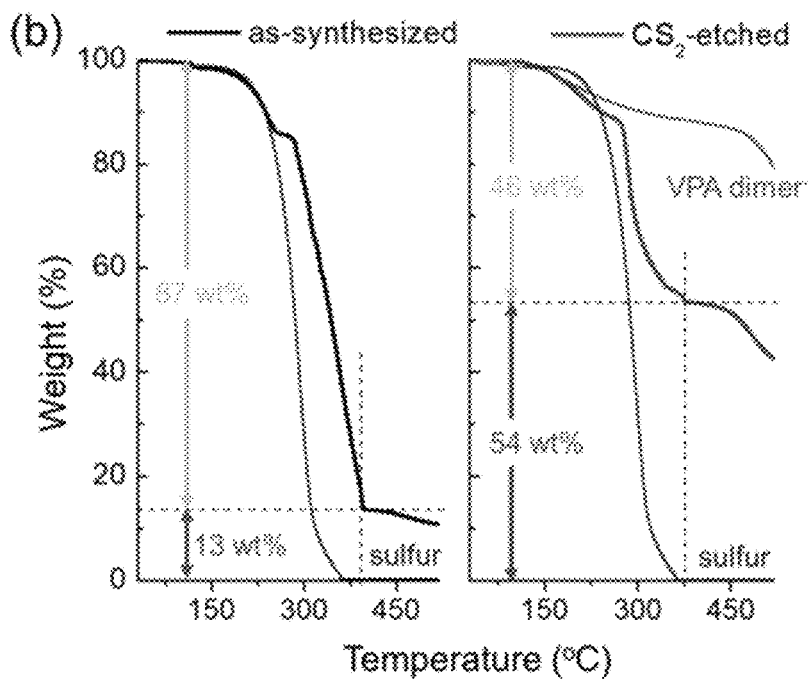

[FIG. 4C]
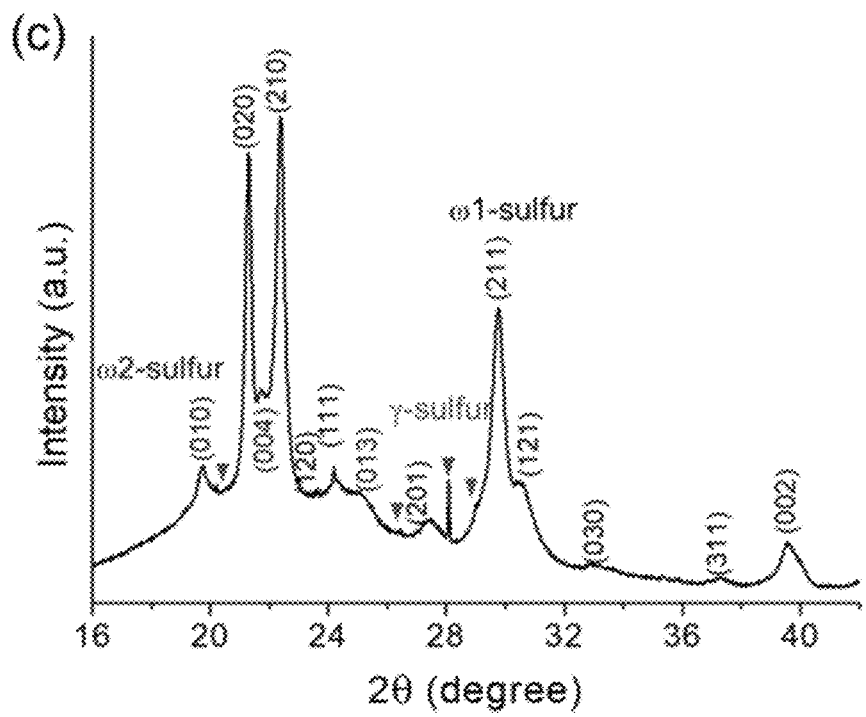
[FIG. 4D]
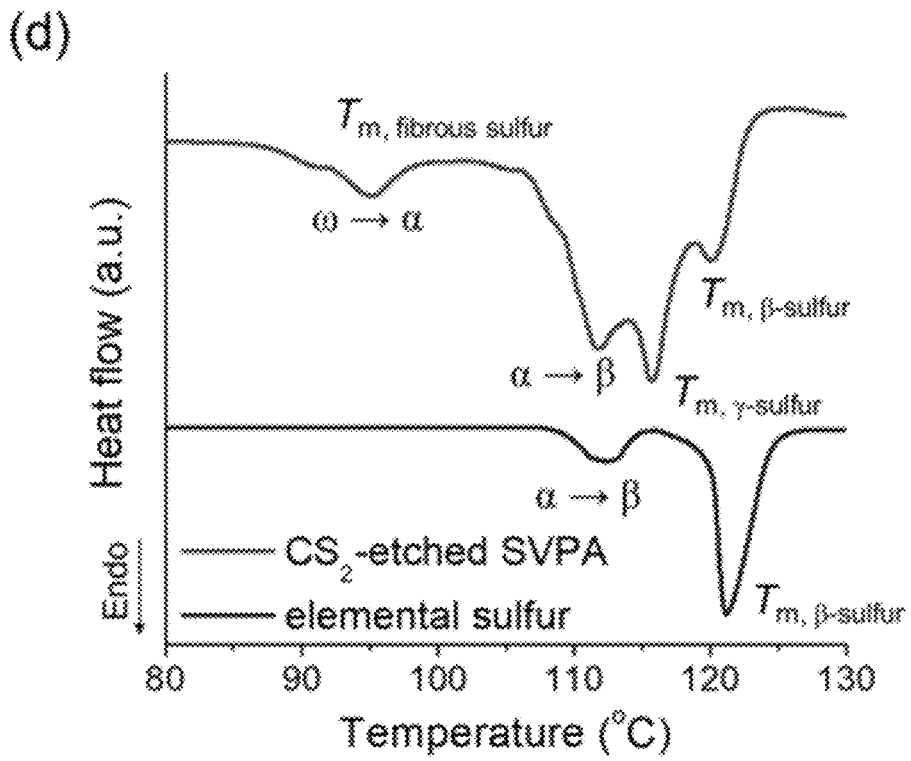

[FIG. 5A]
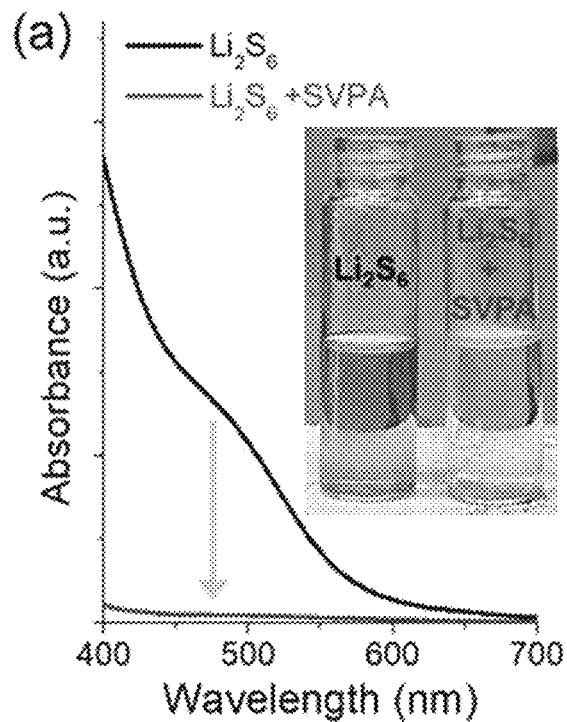
[FIG. 5B]
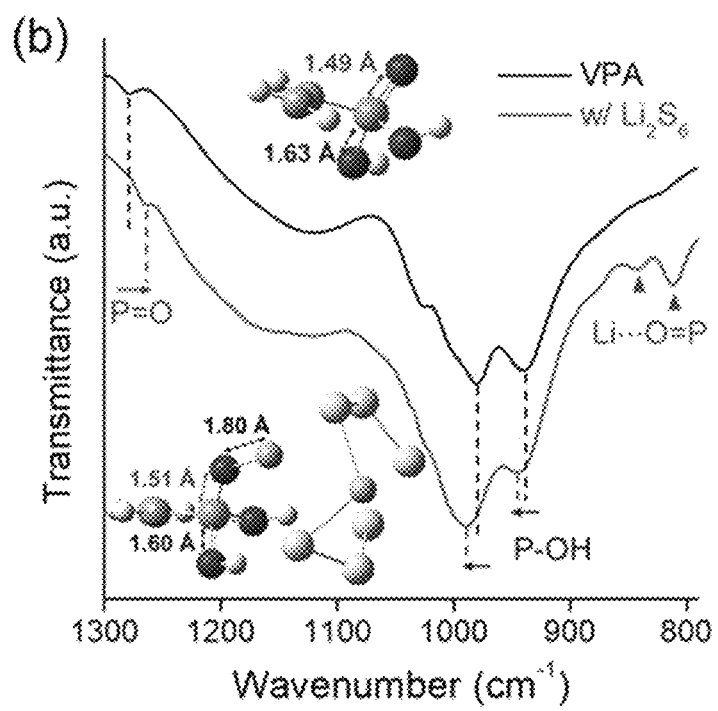

[FIG. 5C]
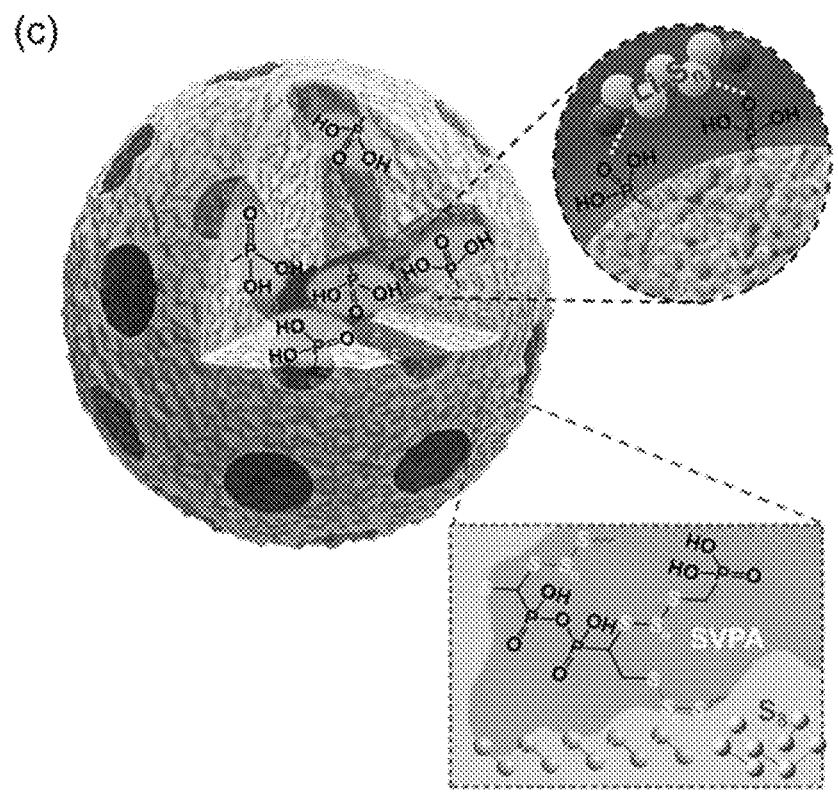
[FIG. 5D]
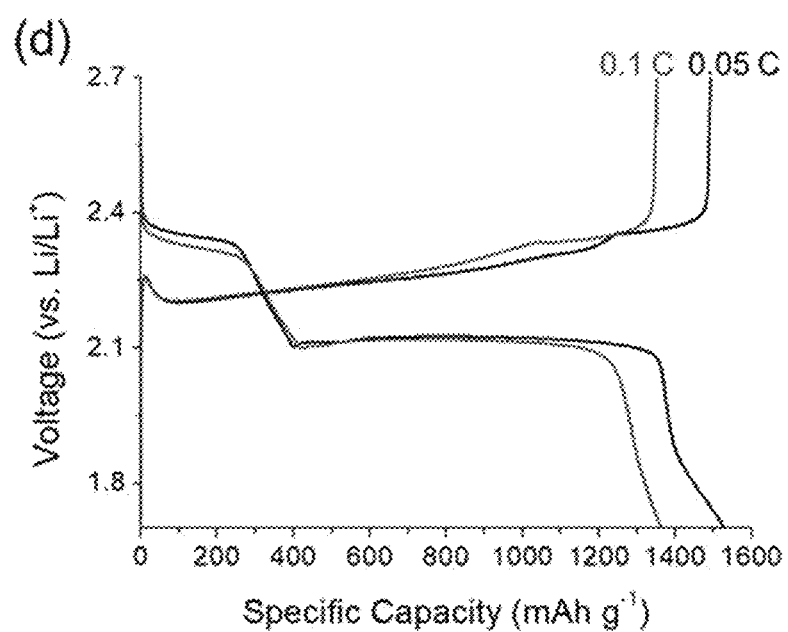

[FIG. 5E]
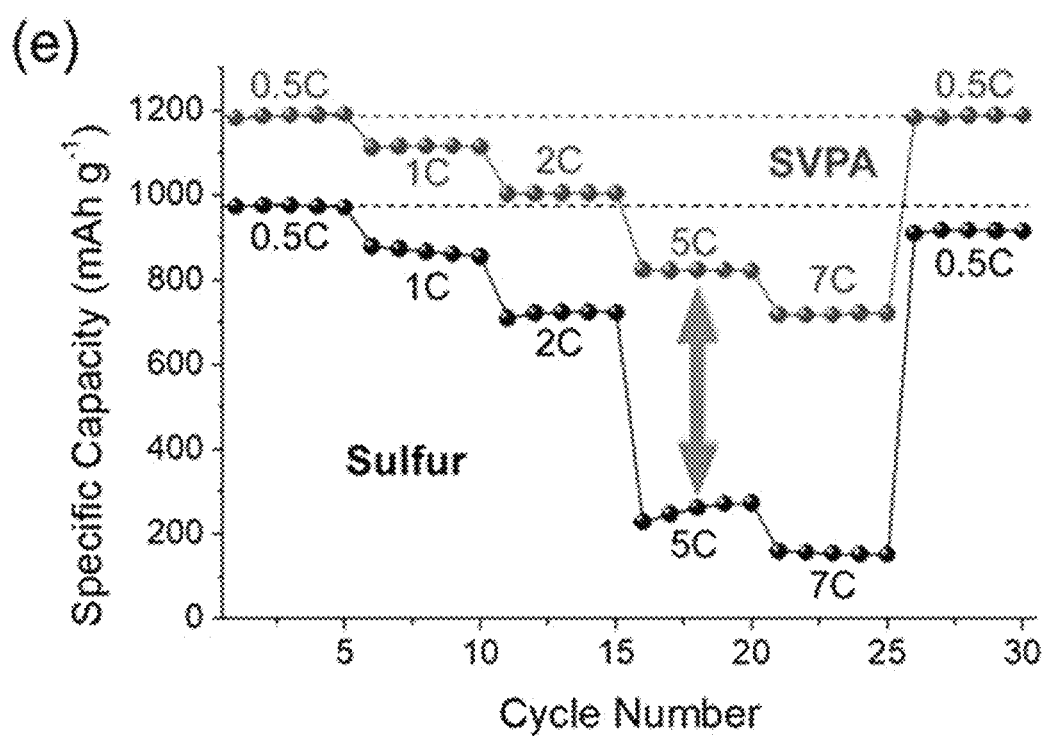

[FIG. 6A]
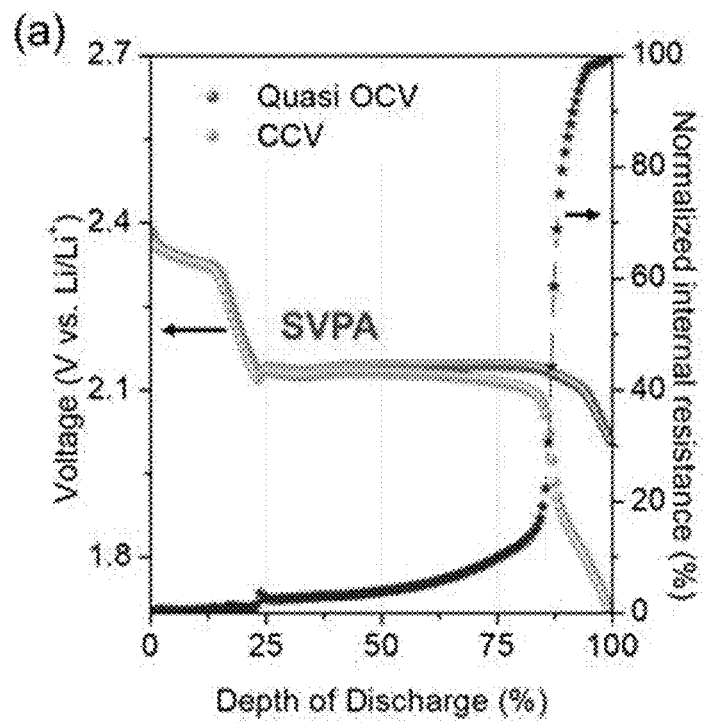
[FIG. 6B]
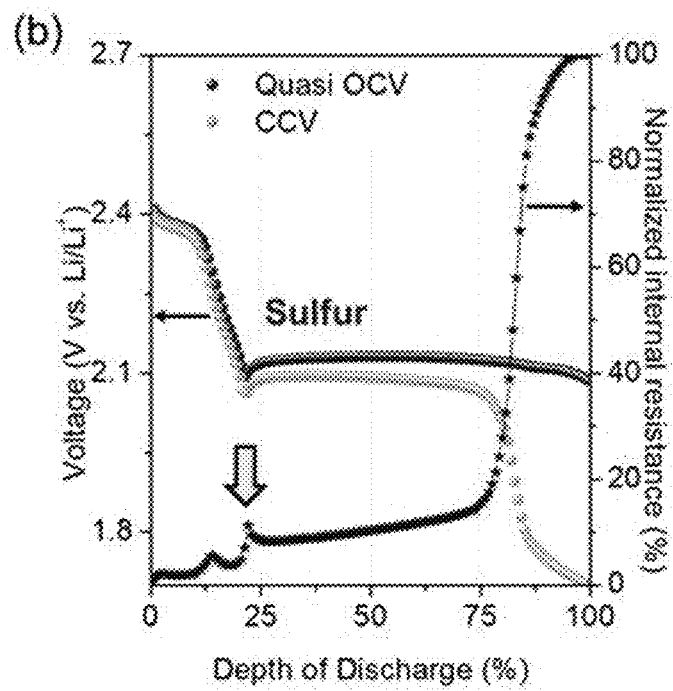

[FIG. 6C]
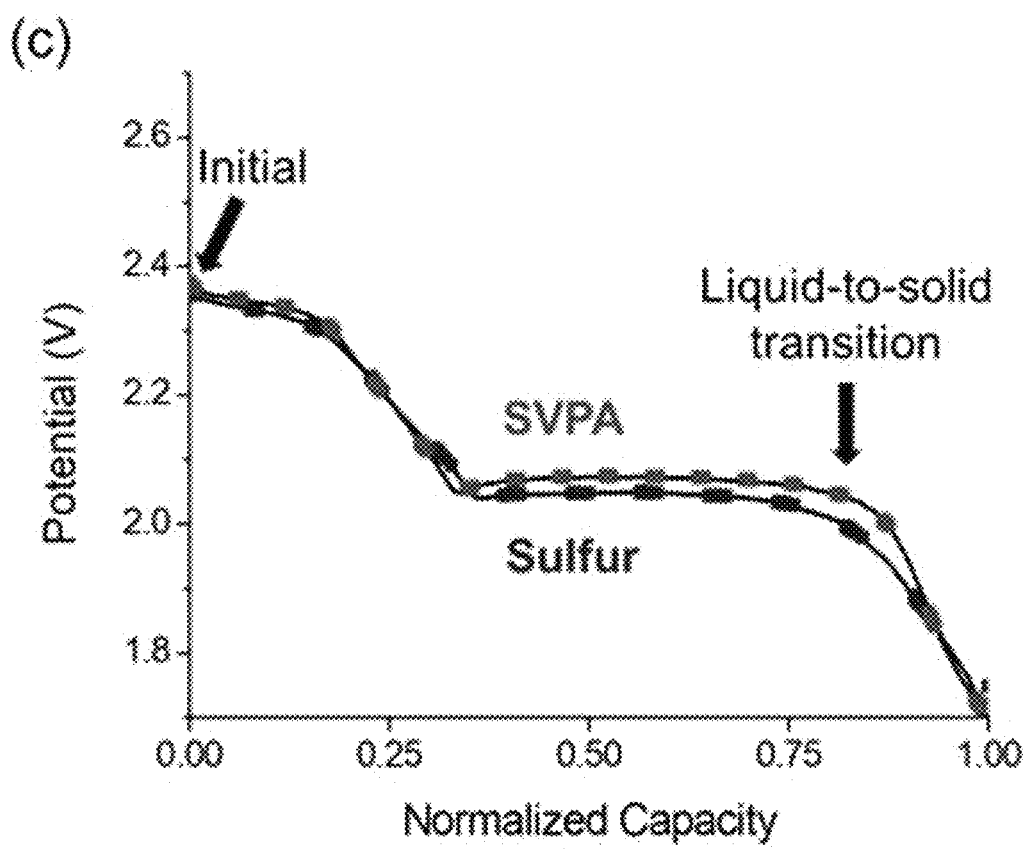

[FIG. 6D]
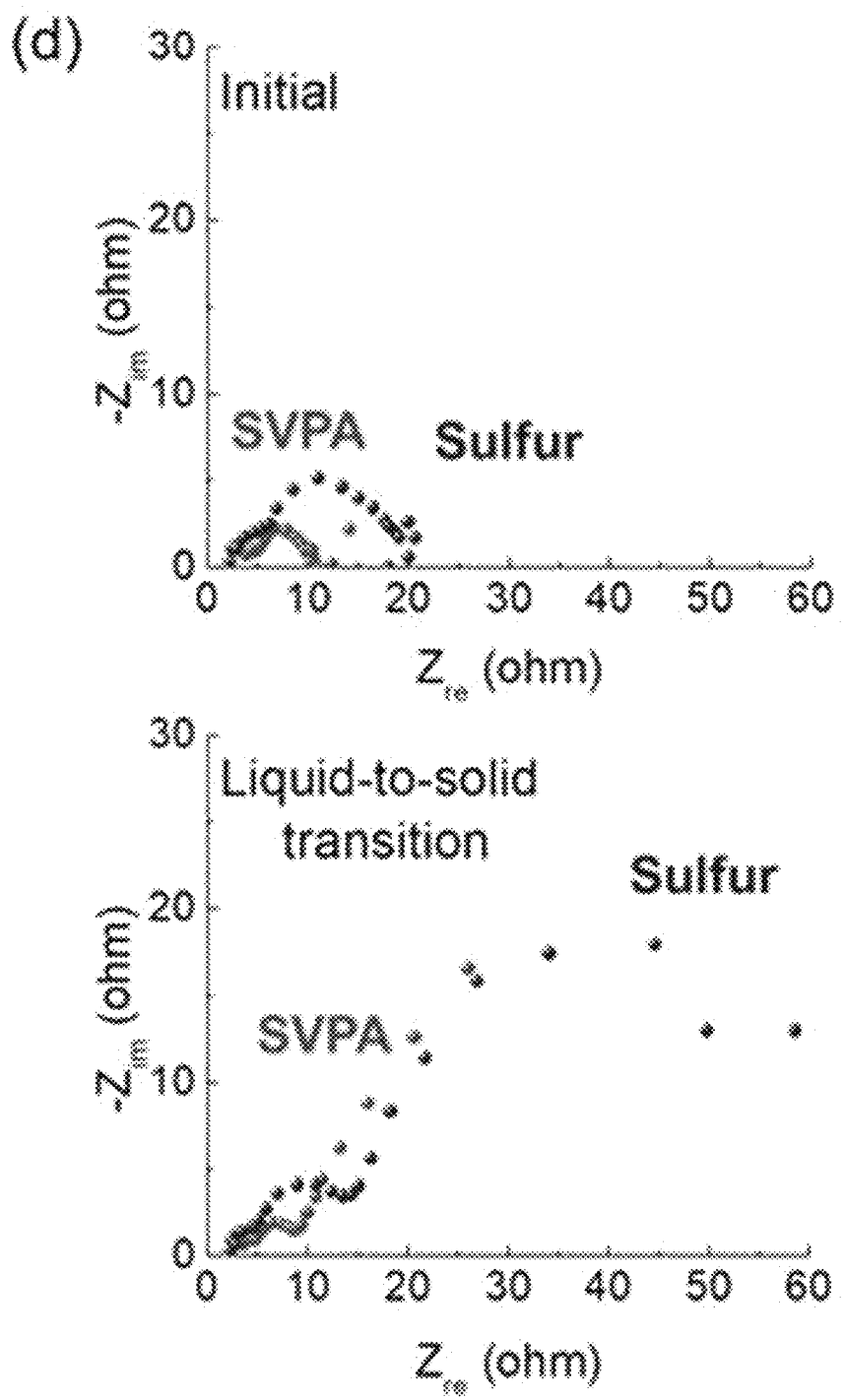

[FIG. 7A]
(a)
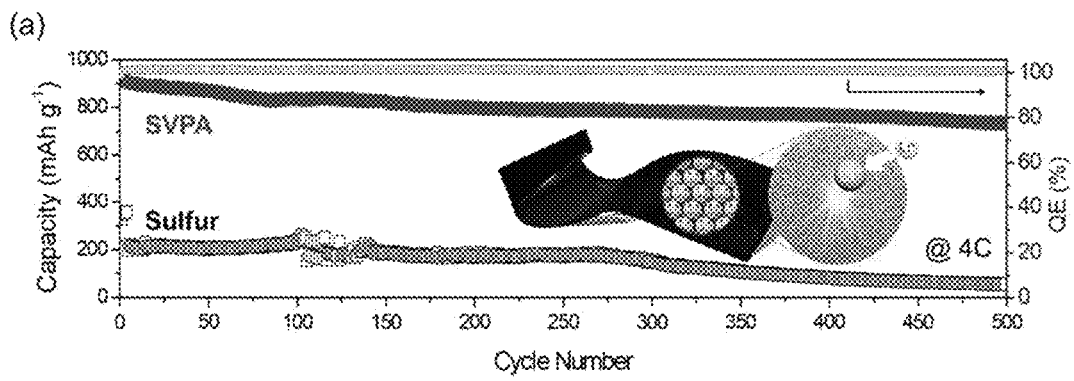
[FIG. 7B]
(b)
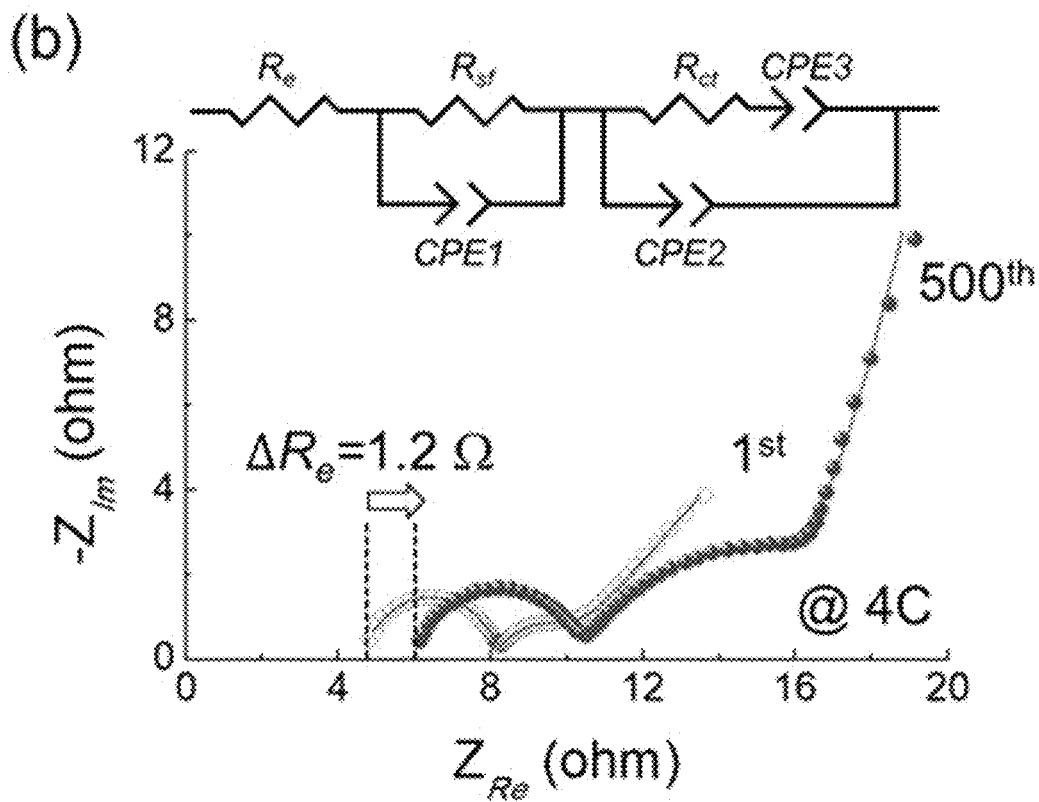

[FIG. 7C]
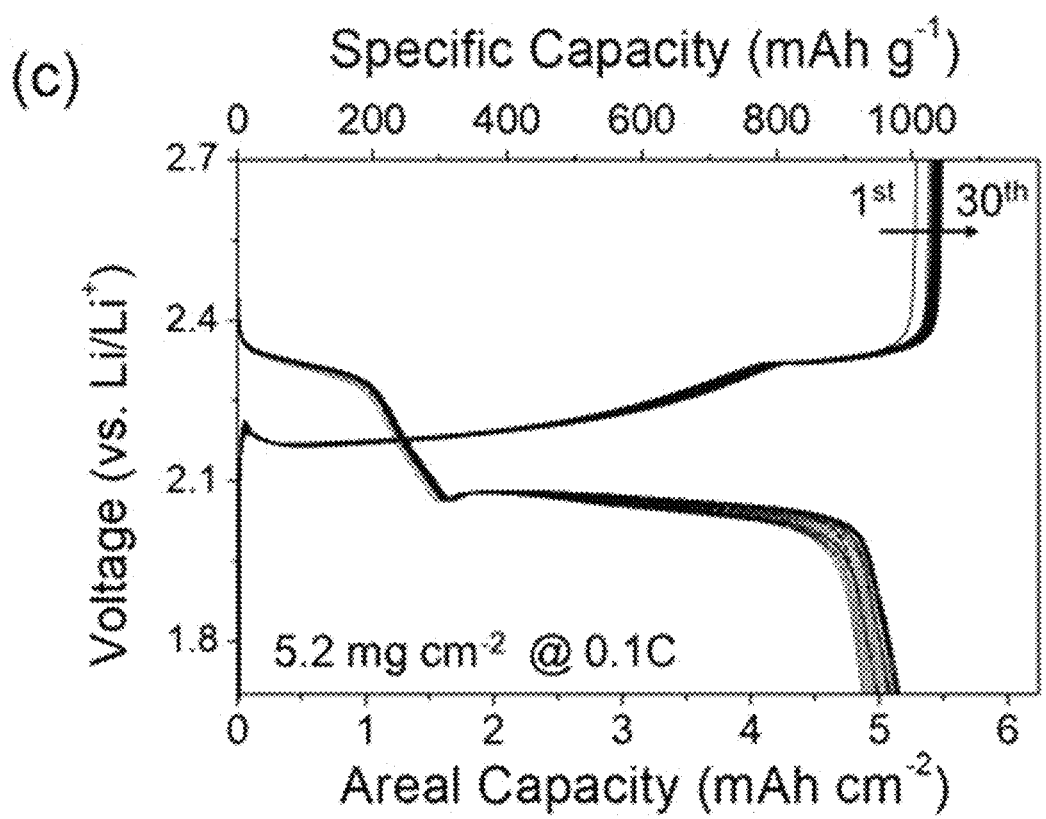

[FIG. 8]
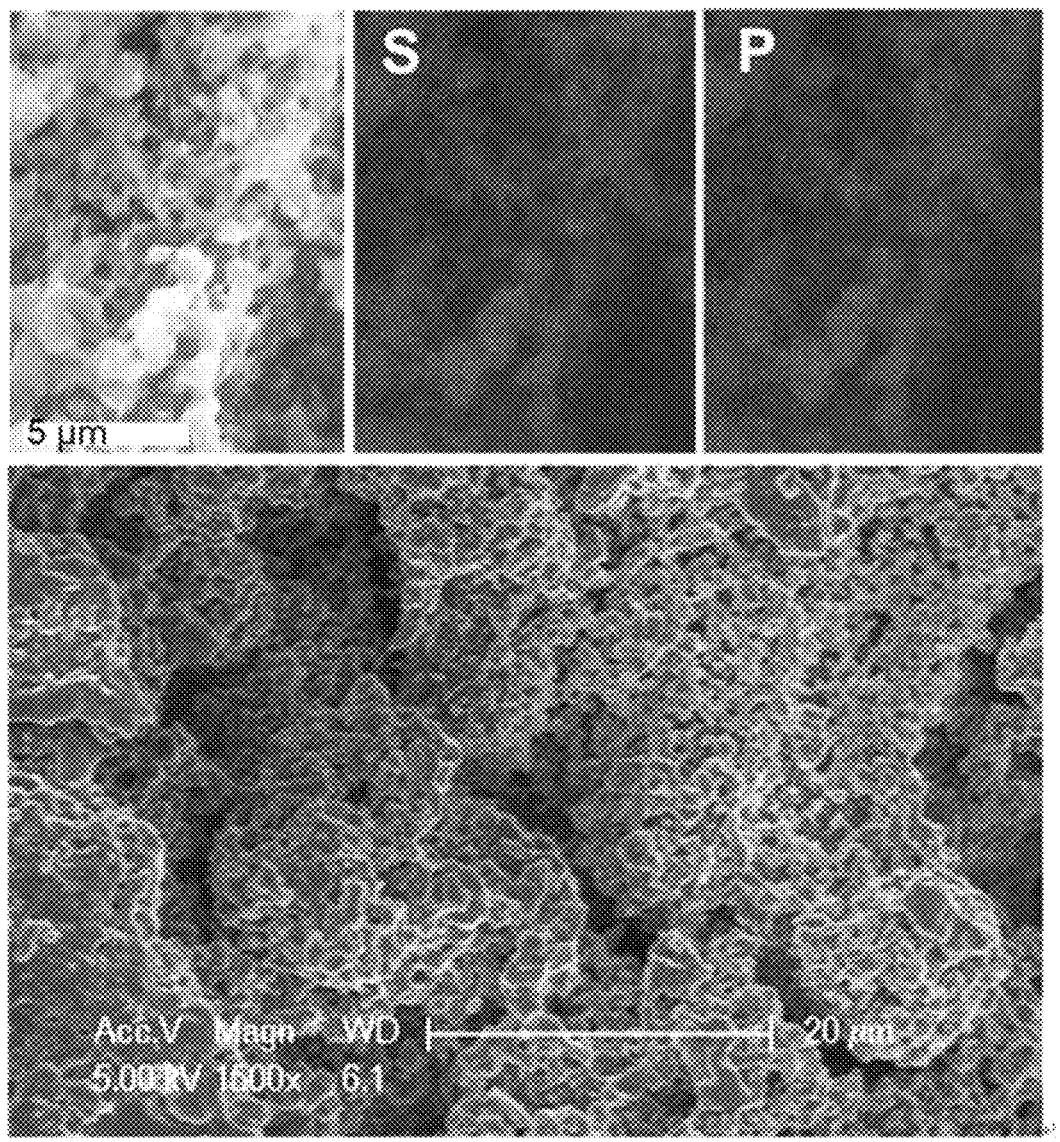

[FIG. 9]
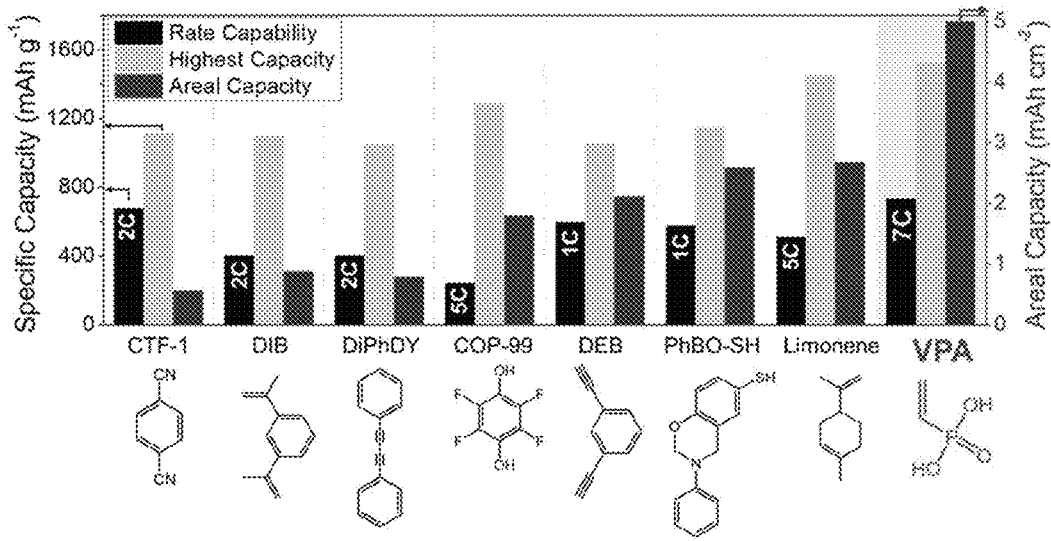
[FIG. 10A]
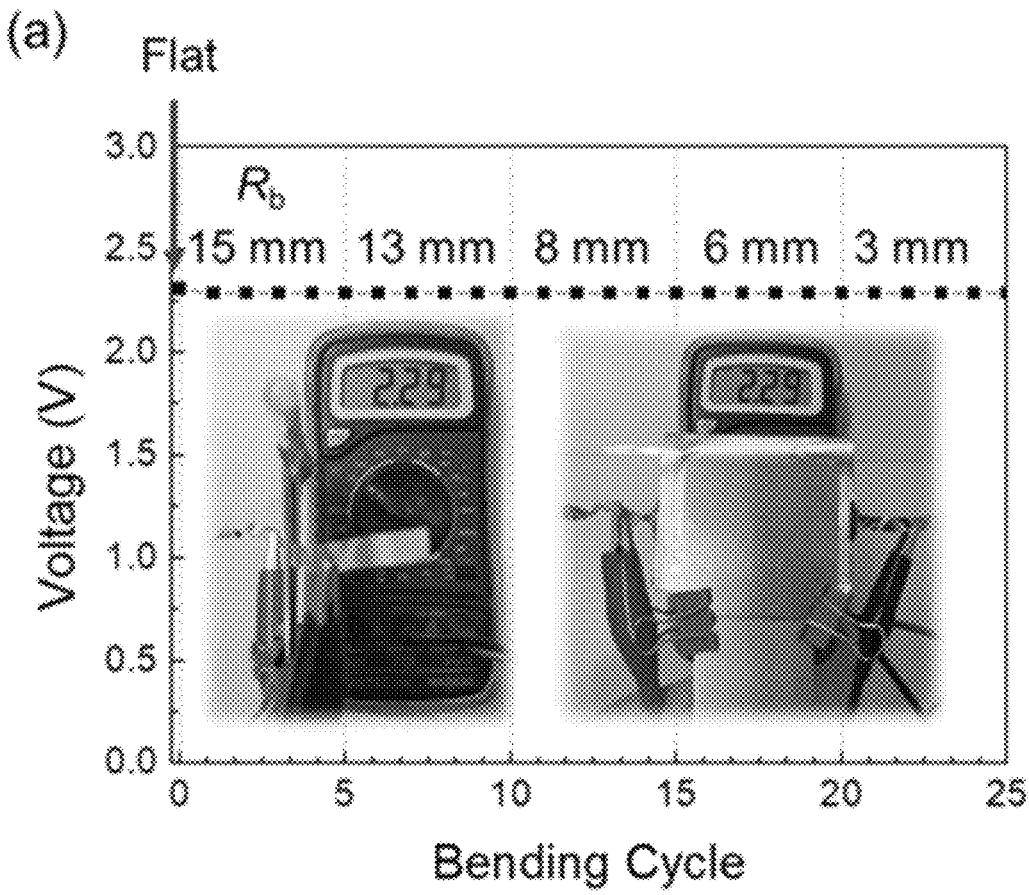

[FIG. 10B]
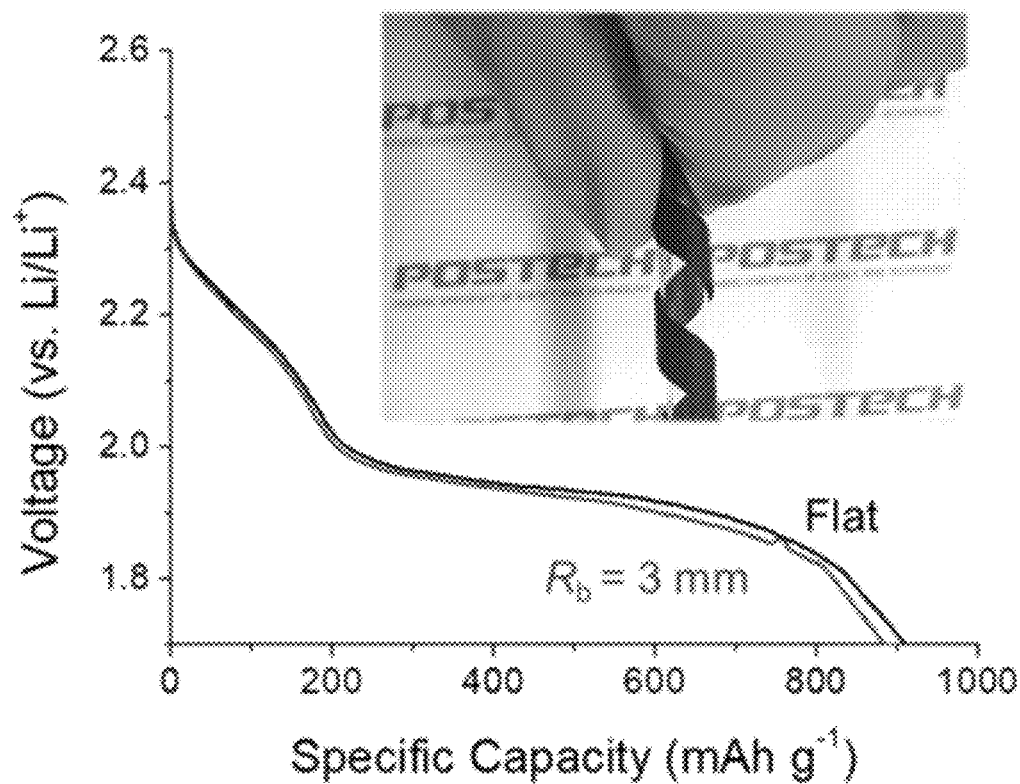
[FIG. 10C]
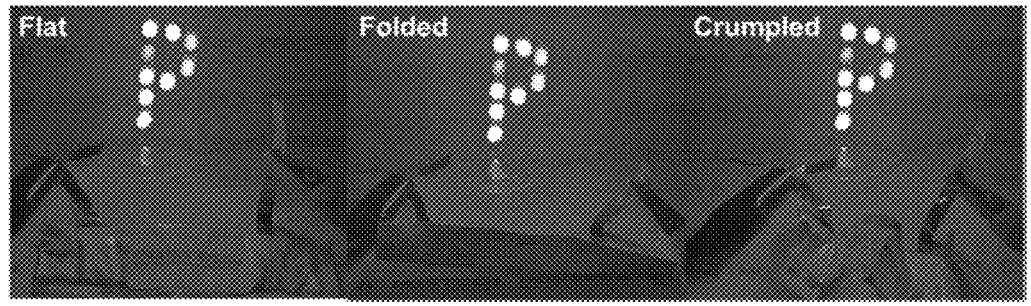

[FIG. 11A]
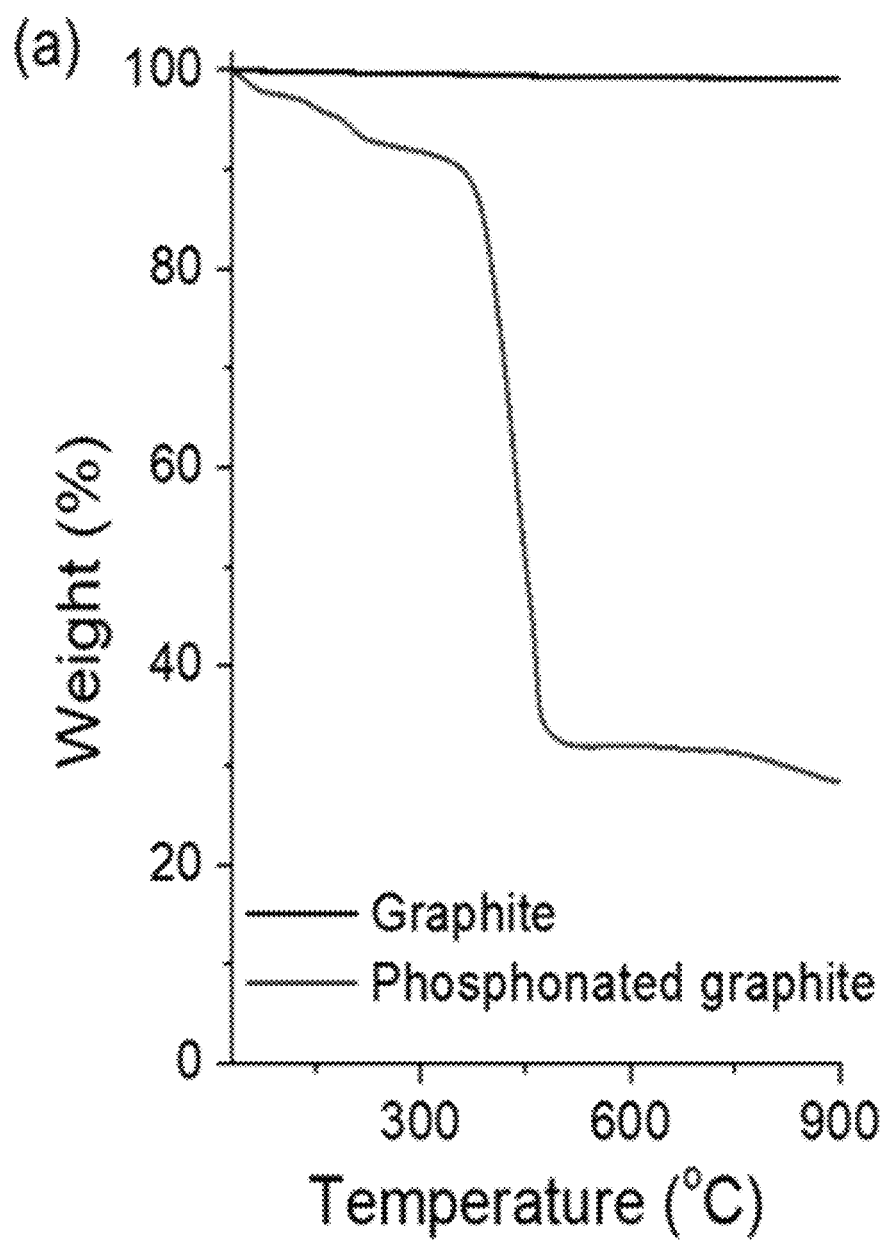

[FIG. 11B]
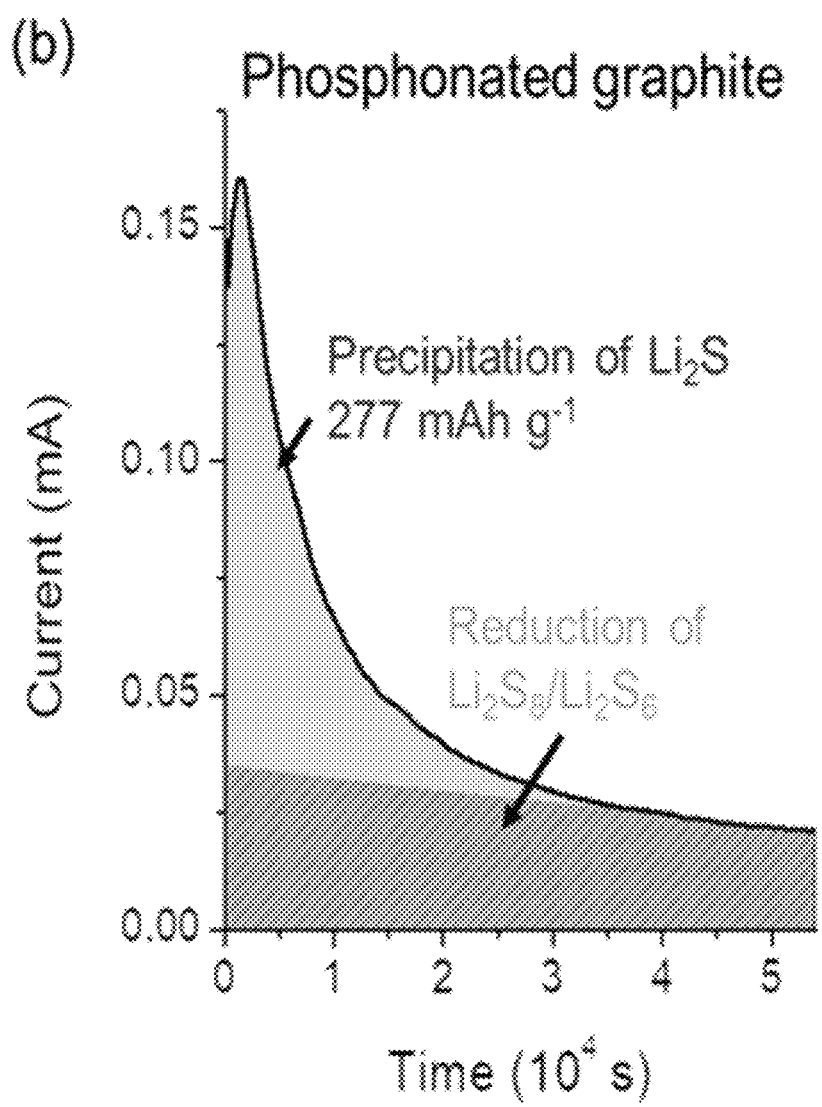

[FIG. 11C]
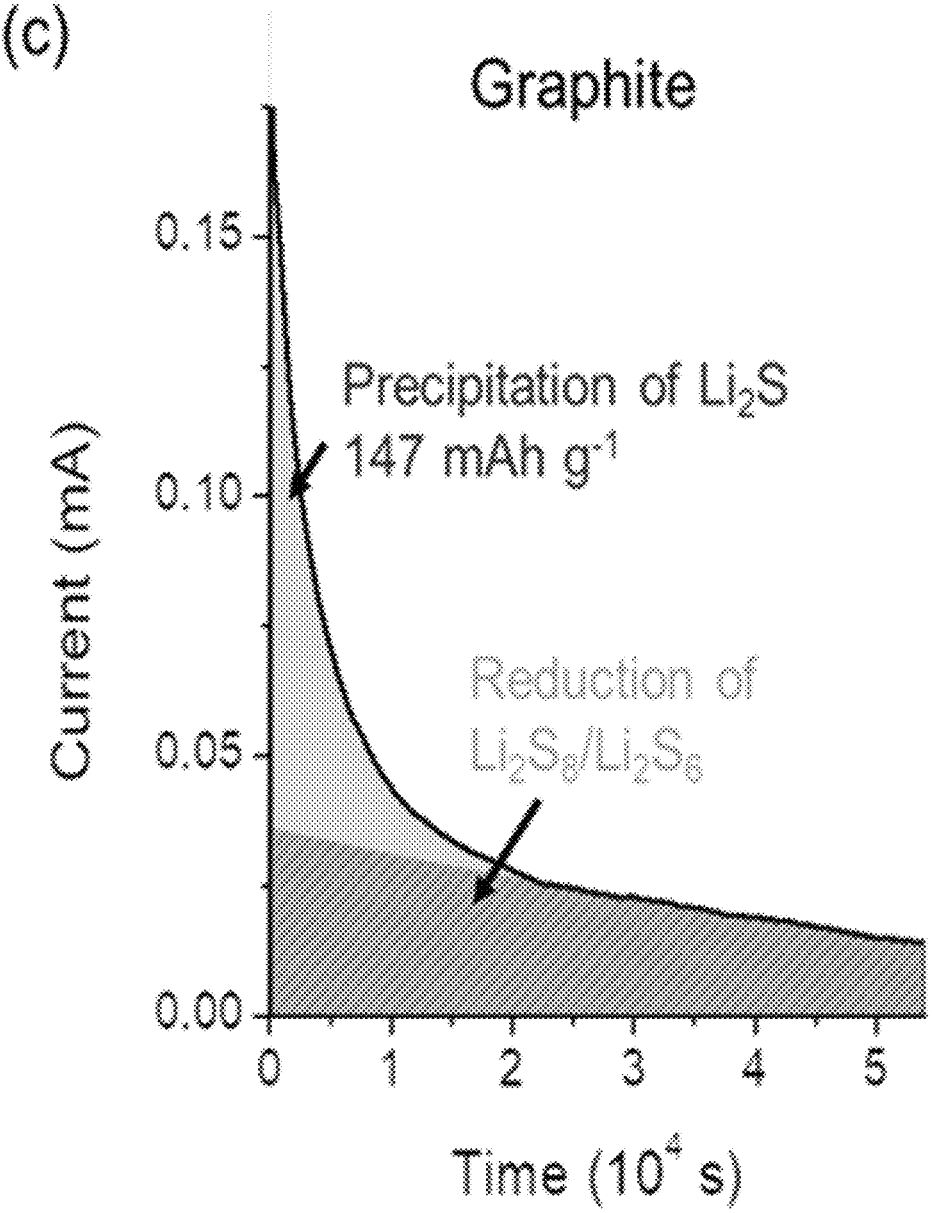

[FIG. 12A]
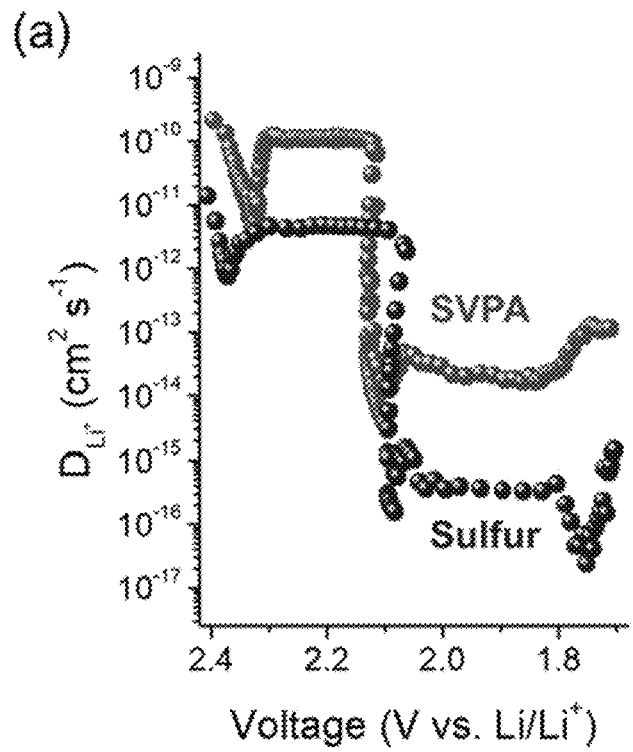
[FIG. 12B]
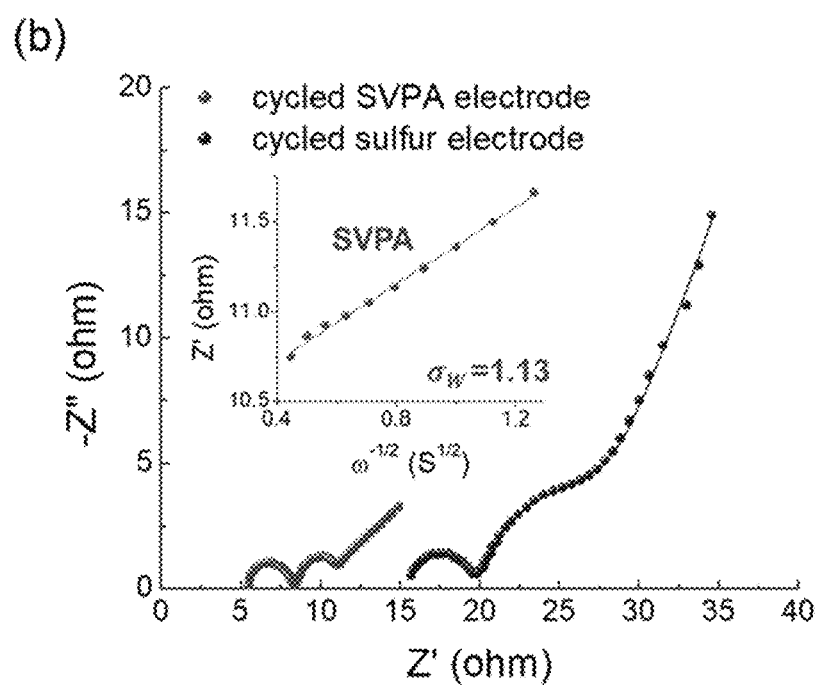

[FIG. 13A]
(a) <before cycle>
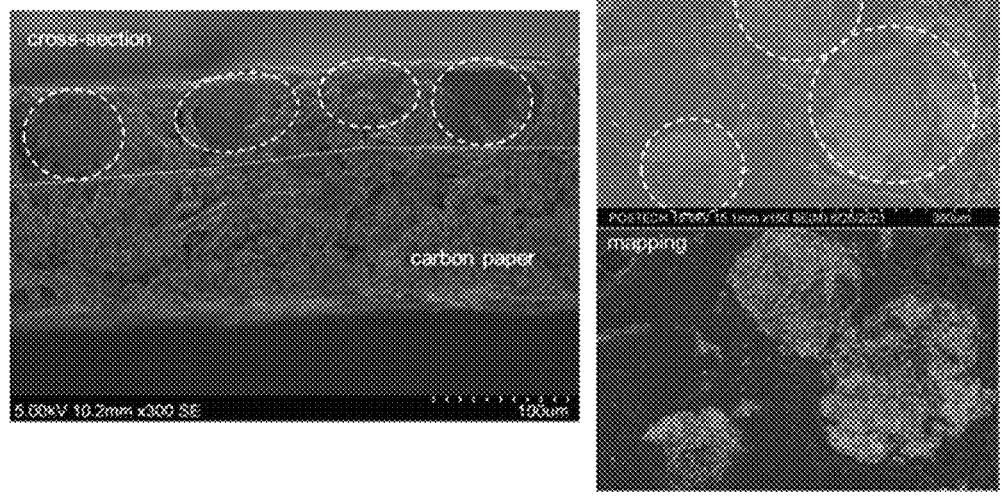
[FIG. 13B]
(b) <discharged to the beginning of 2nd plateau>
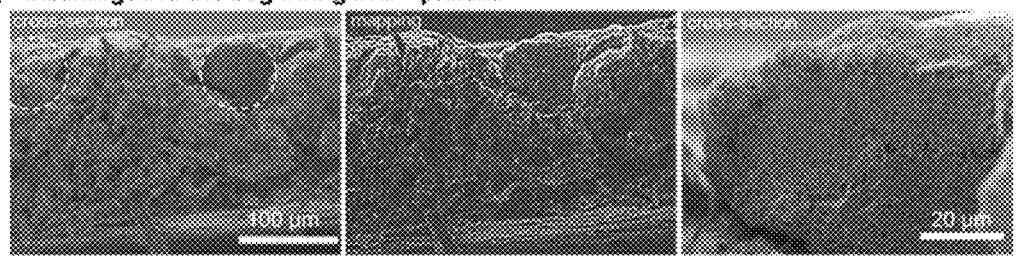
[FIG. 13C]
(c) <after cycle>
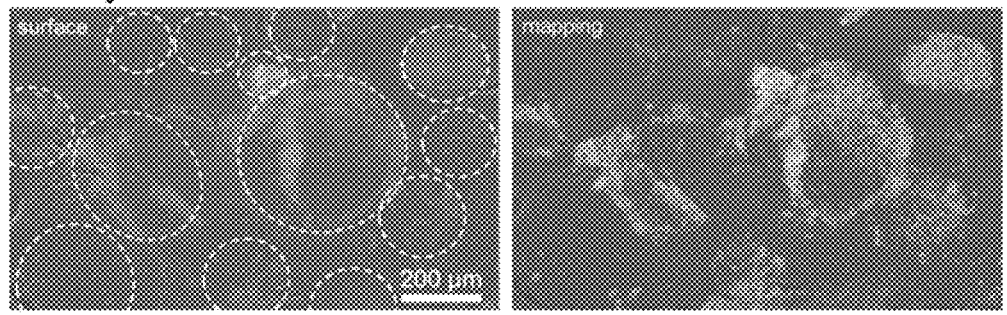

[FIG. 14A]
(a) before cycle
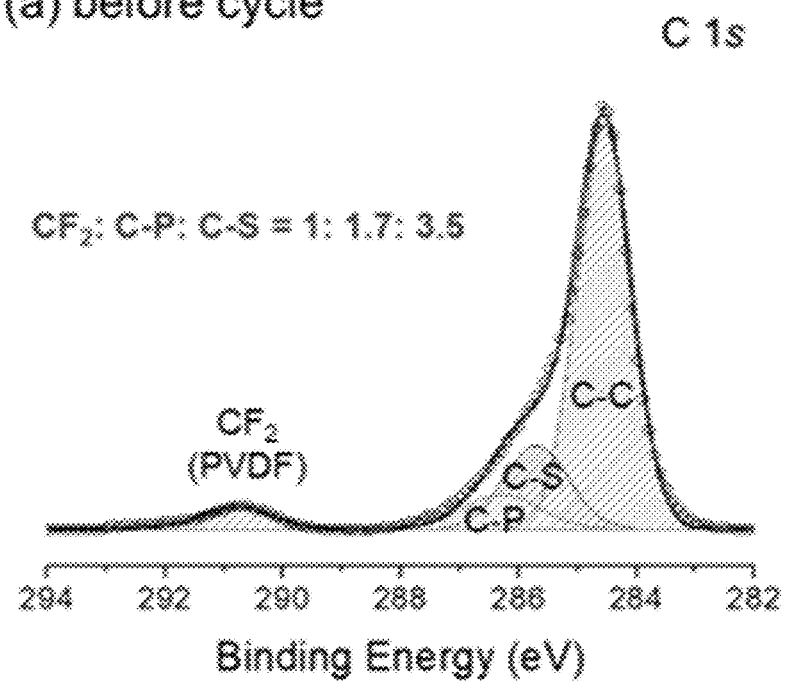
[FIG. 14B]
(b) after cycle
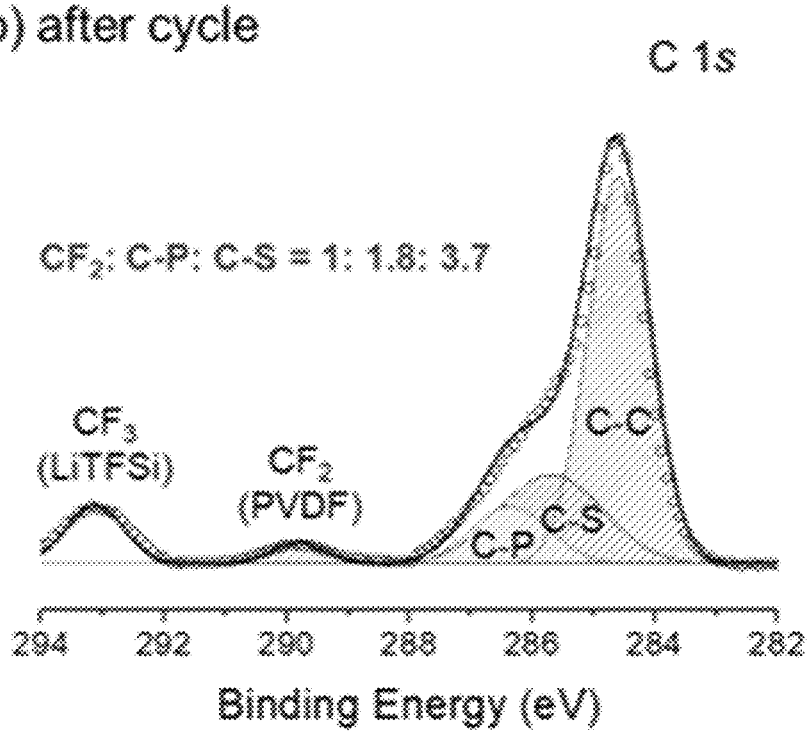

[FIG. 14C]
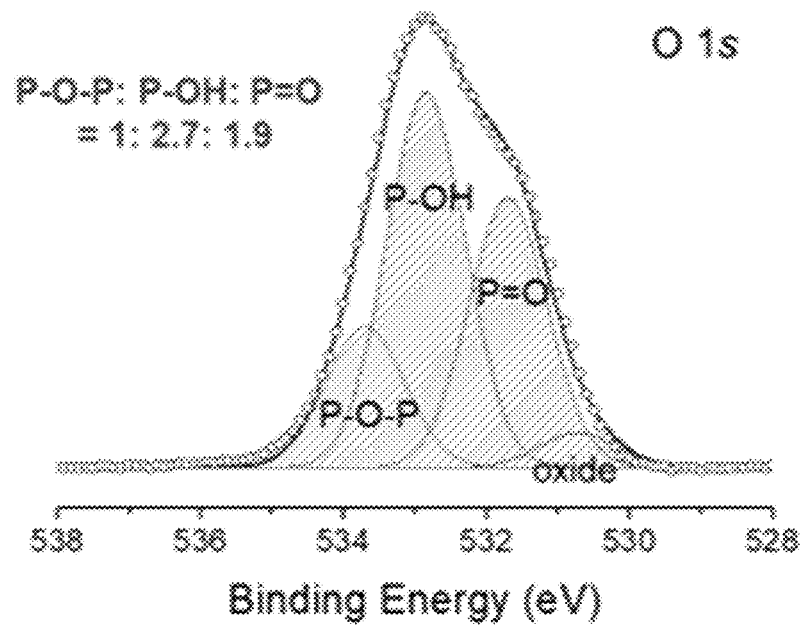
[FIG. 14D]
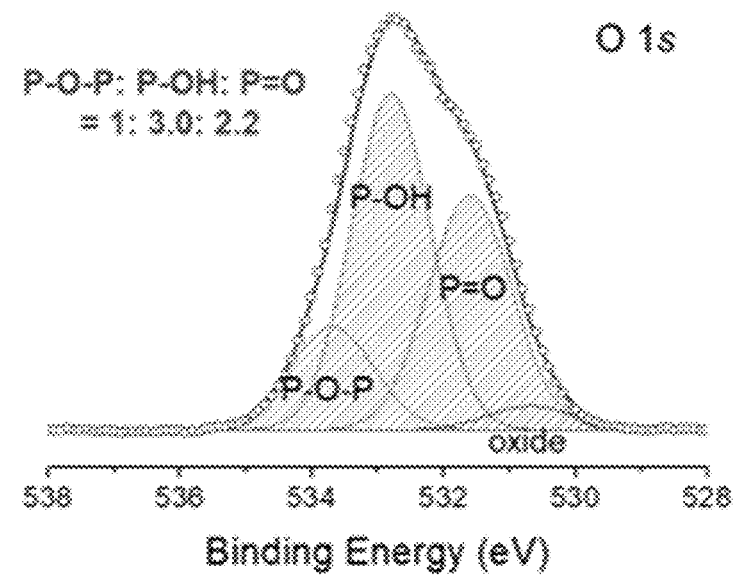

[FIG. 14E]
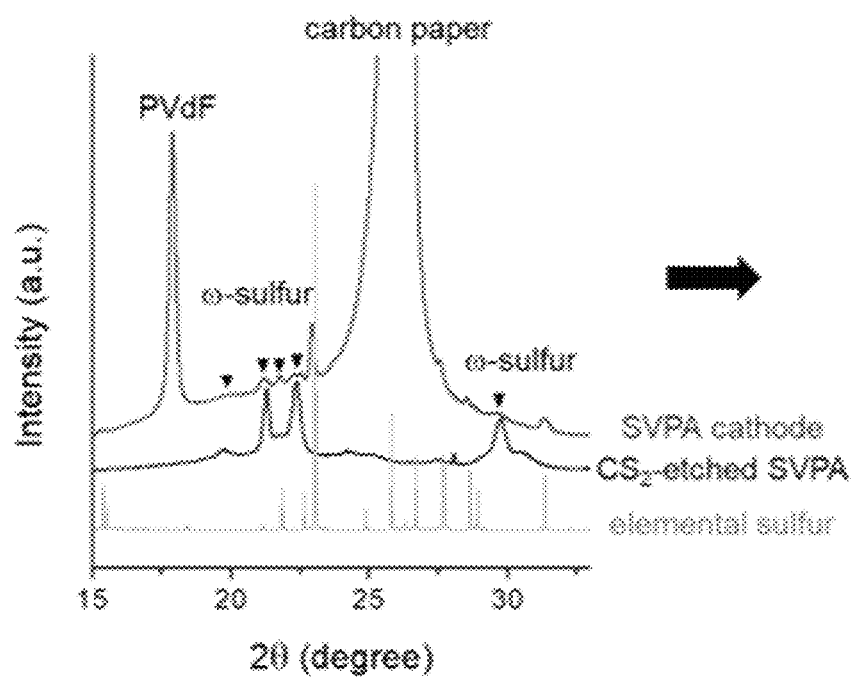
[FIG. 14F]
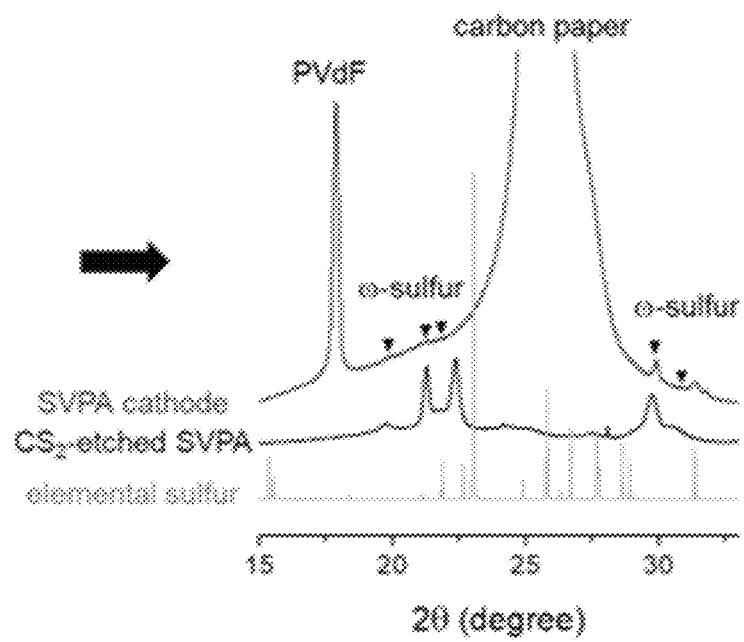

FAST-CHARGING, HIGH-ENERGY, FLEXIBLE LITHIUM-SULFUR BATTERIES BASED ON HIERARCHICALLY ORDERED SULFUR PARTICLES AND PREPARATION METHOD THEREOF

CROSS-REFERENCE TO RELATED APPLICATIONS

This application is based on and claims priority from Korean Patent Application No. 10-2021-0071519, filed on Jun. 2, 2021, with the Korean Intellectual Property Office, the disclosure of which is incorporated herein in its entirety by reference.

TECHNICAL FIELD

The present disclosure relates to a fast-charging, high-energy, flexible lithium-sulfur batteries based on hierarchically ordered sulfur particles and preparation method thereof

BACKGROUND

In response to the growing popularity of intelligent devices and electric vehicles, there is an ever-increasing demand for high-energy, long-life, and fast-charging energy storage systems. This demand cannot be satisfied by current lithium-ion battery technologies, and therefore, focus is progressively shifting toward next-generation batteries.

Among the various candidates, lithium-sulfur (Li—S) batteries have attracted significant attention owing to their high theoretical energy density (2600 Wh $kg^{-1}$) and capacity (1672 $mAh \cdot g^{-1}$). contrary to the high-toxicity transition metal-based cathode materials used at present, sulfur has inherent advantages of low cost, natural abundance, and eco-friendliness. Considering that sulfur is discarded as a by-product of oil refinery processing, its availability to be repurposed as an energy source further strengthens its sustainability credentials.

Nevertheless, extensive research has revealed fatal drawbacks; namely, the high solubility of redox intermediates in polar electrolytes, which causes shuttle effects and poor cycling stability and the fundamentally low electrical conductivity of sulfur, which hampers the complete utilization of active materials, thus limiting rate performance Several approaches have been proposed to overcome these issues, including the physical confinement of active materials with the aid of nanocarbons [*Nano Energy* 57 (2019): 34-40; *Nano Energy* 12 (2015) 657-665] and the chemical confinement of lithium polysulfides (LiPS) by functional organic/inorganic materials [*Adv. Mater.*, 29.11 (2017), Article 1603835; *Adv. Funct. Mater.*, 28.38 (2018), Article 1707520]. Porous carbons and graphene are the most popular nanocarbons utilized to mitigate shuttle effects via the physical entrapment of LiPS. In addition, sulfur wrapped in carbon is envisaged as a means of increasing the charge transport efficiency of active materials. The additional chemical modification of such carbons using polar moieties (e.g., heteroatom dopants, metal carbides, metal oxides, metal nitrides, and metal sulfides) and the introduction of under-coordinated metal atoms (e.g., Fe—N—C and Co—N—C) into carbon frameworks have also been credited with improving battery performance through the synergistic effects of physical and chemical confinements.

Nevertheless, most studies on Li—S batteries report trade-offs between the specific capacity and cycle life that lead to the theoretical capacity either not being realized or being short-lived. In fact, the dissolution of LiPS into electrolytes is thermodynamically favorable; therefore, it cannot be prevented entirely by surrounding the active materials with carbon atoms in the long run. This results in active materials being expended continuously, with the subsequent reactions between polysulfides and the lithium anode leading to poor cycling performance in most Li—S batteries. Additional drawbacks include the high cost of such carbons, difficulties involving mass production, and the complicated fabrication process of electrodes impregnated with sulfur.

While all these studies have contributed valuable insights, the sulfur-rich polymers reported to date exhibit an uncontrollable amorphous morphology, which is linked to the aggregation of active materials over repeated lithiation/delithiation cycles, thus causing an unexpected decline in battery performance. In addition, achieving stable battery operation at increased cathode loadings is an ongoing challenge because of the limited diffusion of electrolytes and lithium ions into the thick active materials. Addressing this issue requires electrode porosity; however, even if pores are introduced during electrode fabrication, it is extremely difficult to preserve the initial structure during repeated charging/discharging of the polymeric cathodes. Accordingly, it is required to develop a novel lithium-sulfur based battery which can be easily manufactured and has high-energy, long-life, and fast-charging characteristics.

SUMMARY

The present disclosure has been made in an effort to provide a novel high-performance cathode active material comprising sulfur.

Further, the present disclosure has been made in an effort to provide a method for preparing a novel high-performance cathode active material comprising sulfur.

Further, the present disclosure has been made in an effort to provide a Cathode material for lithium-sulfur batteries and a lithium-sulfur secondary battery including a novel high-performance cathode active material comprising sulfur.

An exemplary embodiment of the present disclosure provides a cathode active material for a secondary battery, comprising a novel poly(S-co-VPA) vulcanized polymer.

In the present disclosure, the term VPA refers to vinylphosphonic acid.

In the present disclosure, the term poly(S-co-VPA) refers to a copolymer of sulfur and vinylphosphonic acid, and may comprise one or more moieties selected from Chemical Formulas SVPA1, SVPA2, and SVPA3 below preferably within a random polymer, more preferably a molecular structure.

In an embodiment of the present disclosure, the poly(S-co-VPA) may be a copolymer formed by randomly or repeatedly bonding any one or any two moieties selected from the group consisting of Chemical Formulas SVPA1, SVPA2, and SVPA3 below.

In another embodiment of the present disclosure, the poly(S-co-VPA) may be a copolymer formed by randomly or/and repeatedly bonding three moieties selected from Chemical Formulas SVPA1, SVPA2, and SVPA3 below.

[SVPA1]

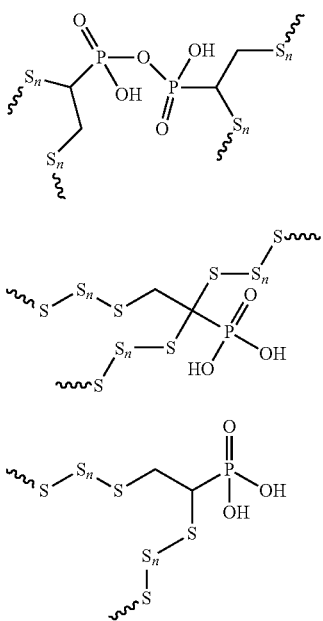

[SVPA2]

[SVPA3]

In formula, ⌇⌇⌇ represents a bonding position, and n is an integer between 1 and 20.

The dimerization of VPA molecules readily occurs at elevated temperatures through self-condensation, thereby yielding acid anhydride. Consecutive reactions with sulfur radicals produce SVPA1. Alternatively, SVPA3 is produced, once the vinyl group of VPA reacts with sulfur radicals and subsequent coupling to other sulfur radicals occurs. Possible chain transfer reaction produces another SVPA polymer, denoted as SVPA2. Accordingly, a poly(S-co-VPA) random copolymer comprising all of Chemical Formulas SVPA1, SVPA2, and SVPA3 within a molecule may be provided in a specific embodiment of the present disclosure.

In the present disclosure, the vulcanized polymer may be an inverse vulcanized polymer.

The cathode active material for the secondary battery (hereinafter, cathode active material) comprising the poly (S-co-VPA) vulcanized polymer according to the present disclosure is preferably spherical, and a three-dimensional porous network may be formed over the entire particle, that is, both inside and outside the particle.

According to a preferred embodiment, the cathode active material according to the present disclosure comprises a poly(S-co-VPA) vulcanized polymer, in which the poly(S-co-VPA) vulcanized polymer is spherical particles having a diameter of 50 to 800 microns, i.e., microparticles. The microparticles are characterized in that they have a wrinkled surface, a number of mesopores, that is, a three-dimensional porous network, are formed throughout the particles, and sulfur, preferably allotropic sulfur, is physically supported within the mesopores to provide a high sulfur content.

According to an embodiment of the present disclosure, sulfur in the cathode active material exists in two forms showing different decomposition behaviors. One is a form in which it is linked to a poly(S-co-VPA) structure (hereinafter referred to as 'SVPA microparticles') by covalent bonding, and the other is a form in which it is physically supported in the mesopores of the SVPA microparticles.

The unique morphology of SVPA microparticles according to the present disclosure allows an electrolyte to be easily penetrated into the particles, and lithium-ion diffusion kinetics may be enhanced across the aligned sulfur domains. Further, the vinyl phosphonate group exhibits an improved effect in chemically immobilizing lithium polysulfide. Further, when preparing the active material due to a high sulfur content, there is no need for a process for additionally impregnating sulfur so that the electrode manufacturing process is shortened.

According to the present disclosure, the cathode active material may comprise 80% to 95% by weight of sulfur with respect to 100% by weight of the total cathode active material.

According to the present disclosure, the poly(S-co-VPA) vulcanized polymer may comprise 40 to 70% by weight of sulfur and 30 to 60% by weight of vinylphosphonic acid (VPA).

According to the present disclosure, the battery may be a lithium-sulfur secondary battery.

Furthermore, another exemplary embodiment of the present disclosure provides a method for preparing a cathode active material for a secondary battery, comprising a poly (S-co-VPA) vulcanized polymer, the method comprising the steps of:

1) mixing sulfur and vinylphosphonic acid, and stirring the mixture for 20 to 60 minutes while heating the mixture to 150° C. to 180° C.;
2) adding the mixture of the step 1) to vinylphosphonic acid to terminate the reaction, and obtaining particles; and
3) washing the obtained particles.

According to the present disclosure, the particles have a spherical shape with a diameter of 50 to 800 microns, a three-dimensional porous network is formed throughout the particles, and sulfur may exist in a form covalently bonded to vinylphosphonic acid and may exist in a form in which it is physically supported in the pores within the three-dimensional porous network.

In an embodiment of the present disclosure, the step 1) may be carried out preferably at 155° C. to 165° C., particularly preferably at 160° C. When sulfur is melted and polymerized with vinylphosphonic acid, it may undergo a λ transition at 160° C. to 190° C. Accordingly, 160° C. may be particularly suitable in order to enable balanced decomposition of S—S bonds while maintaining low viscosity.

According to the present disclosure, the cathode active material prepared by the method for preparing the cathode active material for the secondary battery may be a cathode active material comprising the above-defined poly(S-co-VPA) vulcanized polymer.

According to the present disclosure, the reaction of the step 1) may be carried out within 50 minutes, preferably within 40 minutes, and particularly preferably within 30 minutes. FIG. 1 below shows a process of producing particles according to a change in the reaction time.

According to the present disclosure, the washing of the step 3) may be preferably carried out by repeatedly performing a process of washing the obtained microparticles with methanol and removing the solvent using a centrifuge.

The poly(S-co-VPA) vulcanized polymer of the cathode active material for the secondary battery according to the present disclosure may comprise one or more moieties selected from SVPA1, SVPA2, and SVPA3 within the molecular structure, and the structures of SVPA1, SVPA2, and SVPA3 are the same as previously proposed.

Furthermore, yet another exemplary embodiment of the present disclosure provides a lithium-sulfur battery comprising the cathode active material for the secondary battery.

The lithium-sulfur battery comprising the cathode active material for the secondary battery according to the present disclosure may be easily applied to secondary batteries in various fields due to its high capacity, reliable cycle life, fast charging speed, improved safety, and flexible characteristics.

According to the exemplary embodiments of the present disclosure, sulfur-rich vinylphosphonic acid-based polymer (SVPA) microparticles according to the present disclosure may be quickly synthesized in one-pot with a reaction time of less than 30 minutes, and unlike the conventional art, it is possible to synthesize the particles in a hierarchically aligned form even without using additional solvents, initiators, surfactants, steric stabilizers, etc. so that they may be prepared economically and environmentally friendly. Further, the sulfur domains of an aligned form contribute so that electrochemical reactions may be more efficiently occurred, and effective chemical immobilization of lithium polysulfide is possible due to abundant phosphonate groups on the surface and interface of SVPA microparticles so that the shuttle effect may be mitigated. A lithium-sulfur battery fabricated with an SVPA electrode according to the present disclosure showed a high discharge capacity of 1,529 mAh·g$^{-1}$ at 0.05 C and exhibited a rate capability up to 7 C. Further, since the lithium-sulfur battery shows high energy density, excellent rate capability, and flexibility by exhibiting a discharge capacity of 732 mAh·g$^{-1}$ even after 500 cycles at 4 C, a high areal capacity of about 5 mAh cm$^{-2}$ even with an increased loading amount of 5.2 mg cm$^{2}$, etc., it is more useful than the existing nanocarbon and porous template-based sulfur electrodes, and is easily applied to batteries for driving wearable electronic devices.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is images showing the production of sulfur-rich polymer (SVPA) nanoparticles depending on the reaction time.

FIG. 2 shows a synthesis route (FIG. 2A) of a sulfur-rich polymer (SVPA) according to the present disclosure, scanning electron microscope (SEM) images (FIGS. 2B to 2D) of the prepared SVPA microparticles, an element mapping image (FIG. 2E), SEM images (FIGS. 2F and 2G), and a transmission electron microscope (TEM) image (FIG. 2H).

FIG. 3 is element mapping results of the sulfur-rich polymer (SVPA) microparticles according to the present disclosure.

FIG. 4 is a FT-IR, XPS spectrum result (FIG. 4A), a TGA analysis result (FIG. 4B), an XRD pattern analysis result (FIG. 4C), and a DSC analysis result (FIG. 4D) of the molecular structure and chemical composition of the sulfur-rich polymer (SVPA) microparticles according to the present disclosure.

FIG. 5 is an evaluation of the properties of a lithium-sulfur battery employing SVPA microparticles, in which FIG. 5A is UV-vis spectrum results of a Li$_2$S$_6$ solution before and after putting the SVPA microparticle, FIG. 5B is calculation results of FT-IR spectrum and DFT, FIG. 5C schematically depicts a hierarchically aligned morphology and chemical confinement of the SVPA microparticles, FIG. 5D is constant current discharge/charge voltage curve results, and FIG. 5E is rate test results.

FIG. 6 is quasi-open circuit voltage (OCV), closed circuit voltage (CCV), and normalized polarization plots of a lithium-sulfur battery fabricated with an SVPA cathode (FIG. 6A) and a sulfur cathode (FIG. 6B) obtained from a galvanostatic intermittent titration technique (GITT) experiment; and discharge voltage profiles (FIG. 6C) measured in different discharge states and In-situ GEIS results (FIG. 6D) of the lithium-sulfur battery with an SVPA cathode (red) and a sulfur cathode (blue).

FIG. 7 is results of checking the rate capabilities of a lithium-sulfur battery using an SVPA electrode. FIG. 7A is a long-term cycle lifespan test result of a lithium-sulfur battery obtained by rotating the cell for 500 cycles under a current of 4 C, FIG. 7B is a Nyquist analysis result, and FIG. 7C is a battery performance test result of the SVAP electrode depending on a high loading amount of the active material.

FIG. 8 is results of checking the shapes of the SVPA electrode by disassembling the lithium-sulfur battery after the charge/discharge cycle.

FIG. 9 is a graph comparing rate capabilities, maximum specific capacity values, and areal capacities of the vulcanized polymer-based lithium-sulfur battery reported to date.

FIG. 10, as a flexible battery test result of a lithium-sulfur battery using an SVPA electrode according to the present disclosure, is an open circuit voltage (OCV) result image (FIG. 10A) measured at various bending radii (Rb) ranging from 15 mm to 3 mm, a constant current discharge voltage profile graph (FIG. 10B) of a Li—S pouch cell fabricated with an SVPA cathode and a lithium foil anode in the unperturbed state and at Rb of 3 mm, and a working image (FIG. 10C) of an LED lamp in the folded and crumpled state.

FIG. 11 is a TGA curve (FIG. 11A) of phosphonated graphite and pristine graphite, a time-current curve (FIG. 11B) measured through a constant voltage discharge experiment at 2.05 V of a battery composed of a phosphonated graphite electrode and lithium, and a time-current curve (FIG. 11C) measured through a constant voltage discharge experiment at 2.05 V of a battery composed of a graphite electrode and lithium [0.2M Li$_2$S$_8$ catholyte is used in both FIG. 11B and FIG. 11C].

FIG. 12 is a lithium-ion diffusion coefficient (FIG. 12A) as a function of discharge voltage and a Warburg coefficient (σW) (FIG. 12B) of electrode extracted from low-frequency region (inset) of electrochemical impedance spectroscopy (EIS)[Red shows the results obtained with the SVPA electrode].

FIG. 13 is the case of before the cycle (FIG. 13A), the case in which the discharge is performed only up to the beginning of the second discharge plateau voltage (FIG. 13B), and the case in which both charging and discharging are completely performed (FIG. 13C) as cross-section morphology SEM images, surface morphology SEM images, and element mapping images of an SVPA electrode fabricated with a sulfur mass loading of 3.2 mgs·cm$^{-2}$.

FIG. 14 shows C is XPS spectra (FIGS. 14A and 14B) and O 1s XPS spectra (FIGS. 14C and 14D) measured before and after cycling of the SVPA electrode. At this time, the integral ratios of CF$_2$ peak: C—P peak: C—S peak and P—O—P peak: P—OH peak: P=O peak, which are rarely changed before and after the cycle, are shown. FIGS. 14E and 14F are X-ray powder diffraction (XRD) patterns before and after cycling of a battery using a CS$_2$-etched SVPA electrode.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, embodiments of the present disclosure will be described in detail so that those of ordinary skill in the art to which the present disclosure pertains may easily implement the present disclosure. However, the present disclosure may be embodied in various different forms and is not limited to the embodiments described herein.

Reagent

Sulfur used in the experiment (S, 99.998%), vinylphosphonic acid (VPA, 97%), carbon disulfide ($CS_2$, 99%), 1,3-dioxolane (DOL, 99.8), 1,2-dimethylethane (DME, 99.5%), lithium sulfide ($Li_2S$, 99.98%), and multi-walled carbon nanotubes (c-MWCNTs) functionalized with carboxylic acid were purchased from Sigma-Aldrich, Super P (99+%), N-methyl-2-pyrrolidinone (NMP, 99.5%), and lithium nitrate ($LiNO_3$, 99.999%) were purchased from Alfa Aesar. Lithium bis(trifluoromethanesulfonyl)imide (LiTFSI, 98.0%), polyvinylidene difluoride (PVDF), and carbon paper (210 μm, MGL 190) were respectively purchased from Tokyo Chemical Industry Co., Ltd., Solvay, and AvCarb Material Solutions. All materials were used as purchased.

Calculation

The optimized geometries, intermolecular interaction, and binding energies with lithium polysulfide of sulfur-rich vinylphosphonic acid (SVPA) microparticles were calculated based on the B3PW91 functional and deft-SVP basis set using Gaussian 09 software.

Example 1. Synthesis of Sulfur-Rich Microparticles

Sulfur-rich microparticles were prepared by one-pot synthesis of sulfur and vinylphosphonic acid (VPA) through an inverse vulcanization reaction. Specifically, the inverse vulcanization reaction of sulfur and vinylphosphonic acid was performed at 160° C. After putting sulfur and vinylphosphonic acid into a 20 mL glass vial at a weight ratio of 6:4, sulfur was melted by applying heat to the mixture. As the mixture became uniform, the stirring speed was increased to 600 rpm, and when phase separation such as bubbles occurred, the reaction mixture was further stirred at a stirring speed of 1,800 rpm for 20 minutes. The reaction was terminated by pouring the reaction mixture into a container containing separately prepared vinylphosphonic acid to precipitate sulfur-rich vinylphosphonic acid (SVPA) microparticles. The precipitated SVPA microparticles were recovered. The recovered SVPA microparticles were washed several times with methanol using a centrifuge to remove the remaining vinylphosphonic acid, and vacuum dried.

Synthesis Confirmation

Morphologies of the synthesized microparticles and the microparticles etched with $CS_2$ were confirmed by a field emission scanning electron microscope (FE-SEM, XL30S FEG, Philips) and a transmission electron microscope (TEM, JEM-2200FS, JEOL). TEM sampling was performed using a microtome (PT-XL PowerTome Ultramicrotomes, RMC Boeckeler).

The chemical structure and elemental composition of the synthesized microparticles were checked by Fourier transform infrared spectroscopy (FT-IR, Two IR spectrometer, PerkinElmer), X-ray photoelectron spectroscopy (XPS, ESCALAB 250, Thermo Scientific), thermogravimetric analysis (TGA, Q50, TA Instruments), and elemental analyzer (EA, vario MICRO cube, Elementar). Analysis of the crystalline phase of SVPA microparticles was checked by differential scanning calorimetry (DSC, Q20, TA Instruments) and X-ray powder diffraction (XRD, 9B beamline at Pohang Accelerator Laboratory).

In the lithium polysulfide adsorption experiment, a $Li_2S_6$ solution was synthesized using DOL:DME (1:1 vol %) as a solvent according to the equivalent ratio of sulfur and $Li_2S$, and UV-Vis absorption (UV-2600, Shimadzu) was measured before and after putting sulfur-rich vinylphosphonic acid (SVPA) microparticles into the synthesized $Li_2S_6$ solution.

The sulfur-rich polymer (SVPA) according to the present disclosure is prepared as homogeneous spherical microparticles at high yield. FIG. 1 is images showing the production process of the sulfur-rich polymer (SVPA) nanoparticles changing depending on the reaction time.

FIG. 2A is three pathways (SVPA1, SVPA2 and SVPA3) of the synthesis of the sulfur-rich polymer (SVPA) according to the present disclosure and an image (inset) of the prepared SVPA. The dimerization of VPA molecules readily occurs at elevated temperatures through self-condensation, thereby yielding acid anhydride. Consecutive reactions with sulfur radicals produce SVPA1. Alternatively, SVPA3 is produced, once the vinyl group of VPA reacts with sulfur radicals and subsequent coupling to other sulfur radicals occurs. Possible chain transfer reaction produces another SVPA polymer, denoted as SVPA2. All reactions were carried out within a very short time of less than 30 minutes, and the progress of the reactions could be checked by monitoring the content of vinyl groups of VPA using FT-IR spectroscopy. It may be visually confirmed that the prepared microparticles have a homogeneous spherical shape in the inserted image in the lower left of FIG. 2A.

FIGS. 2B to 2D are scanning electron microscope images of the synthesized microparticles, showing that the synthesized particles have a diameter of several hundred microns and have a wrinkled microporous surface. FIG. 2E is an element mapping image, and the insets are cross-sectional images obtained after milling the particles using a focused ion beam, showing that sulfur and phosphorus atoms are uniformly distributed throughout the particles.

The key to which the SVPA microparticles according to the present disclosure may be uniformly produced in a short reaction time is the autocatalytic reaction of VPA reacting with sulfur radicals and high temperatures, for example, a reaction temperature of 160° C. Long sulfur chain molecules to which VPA is linked are generated at the beginning of the reaction to stabilize the spherical form of SVPA In-situ even in the absence of a surfactant. At this time, autoacceleration (Trommsdorff effect) may be avoided by controlling the diffusion of radical species through the viscosity of molten sulfur. Considering that the polymerization temperature of molten sulfur undergoes a λ transition between 160° C. and 190° C., 160° C. was chosen as the lowest reaction temperature to enable balanced decomposition of S—S bonds while maintaining low viscosity.

In order to confirm the presence of sulfur that is not linked by covalent bonding, etching was made with carbon disulfide and morphologies of the SVPA microparticles was confirmed, and these are shown in FIGS. 2F to 2H. Hierarchical porous structures connected to each other throughout the particles were clearly observed using SEM and TEM, and it may be observed that mesopores with a size of several tens of nanometers and pores with a size of microns coexist.

FIG. 3 is element mapping results of the SVPA microparticles etched with carbon disulfide, showing that sulfur, phosphorus, and oxygen are uniformly distributed. This means that the SVPA microparticles exist in a hierarchically aligned form by being composed of a microporous SVPA structure and a phase-separated sulfur-nanodomain. The surface area of the SVPA microparticles measured by nitrogen adsorption analysis is 121.11 $m^2 \cdot g^{-1}$.

FIG. 4 is results of confirming the molecular structure and chemical composition of the SVPA microparticles. FIG. 4A is results of checking the FT-IR and XPS spectra after etching the particles with carbon disulfide, in which absorption bands representing S—S, C—S, and C—P bonds and phosphonate groups were observed in the FT-IR spectrum, and the presence of P—O—P, P—OH and P=O bonds of the SVPA structure may be checked in the O1s XPS spectrum. These results suggest that SVPA is formed by covalent bonding of sulfur and VPA.

FIG. 4B is a TGA analysis result, and shows that the total sulfur content in the SVPA microparticles is 85% by weight or more. Meanwhile, sulfur is present in two forms in the SVPA microparticles according to the present disclosure, one is a form in which sulfur is linked covalently to the SVPA structure, and the other is a form in which sulfur is physically supported in mesopores, in which these two forms exhibit different decomposition behaviors. Therefore, when sulfur in a physically supported form is removed through carbon disulfide etching, only sulfur linked covalently to the SVPA structure may be left so that the mass ratio of covalently linked sulfur to physically supported sulfur may be calculated through this. As shown in the $CS_2$-etched graph of FIG. 4B, the mass ratio of the covalently linked sulfur to VPA present in the SVPA structure was calculated to be 46:54. This indicates that the contents of sulfur contained in the mesopores and the SVPA structure are 76% by weight and 11% by weight respectively (13% by weight for VPA). Further studies confirmed that about 20 sulfur atoms per VPA exist together, and about 3 among them are covalently bonded to the VPA.

SVPA according to the present disclosure has a crystalline structure unlike the conventional amorphous vulcanized polymer. FIG. 4C shows that SVPA according to the present disclosure has a crystalline structure, and representative XRD patterns of SVPA microparticles etched with $CS_2$ show that sulfur allotropes composed of ω1-sulfur (black), ω2-sulfur (blue), and γ sulfur (green) coexist. In addition, orthorhombic α-sulfur, which was predominantly present in the mesopores, was observed. This result is a very noteworthy result considering that α-sulfur exists in the most stable form at room temperature/atmospheric pressure conditions. The XRD results demonstrated that the sulfur constituting the SVPA according to the present disclosure is composed of different phases and has a crystalline structure.

FIG. 4D is a DSC result, and shows that unique phase transitions not observed in general sulfur exist in the SVPA structure according to the present disclosure: ω-to-α at 95° C., $T_m$ of fibrous ω-sulfur at 105° C., α- to-β at 112° C., $T_m$ of γ-sulfur at 116° C., and $T_m$ of β-sulfur at 120° C.

Various sulfur allotropes produced during SVPA synthesis should be an important mechanism of explaining the formation of hierarchically aligned structures and wrinkled surfaces. In the final stage of the reaction, allotropes other than α-sulfur are not stabilized to result in spontaneous microphase separation between covalently linked sulfur and physically supported sulfur. Since γ-sulfur and ω-sulfur in the SVPA structure have lower densities than the physically supported α-sulfur, mechanical stress is caused on the particle surface to form wrinkles and voids. Due to the unique morphology of SVPA, an electrolyte is easily penetrated into the particles, and lithium ion diffusion kinetics may be enhanced throughout the aligned sulfur domains. Additionally, these structural features may contribute to preserving the integrity of the cathode during repetitive decay shrinkage/expansion processes associated with the reaction with lithium.

Manufacturing Example 1. Fabrication of Lithium-Sulfur Batteries

Sulfur electrodes were fabricated using two different loading amounts of up to 2.0 mg $cm^{-2}$ and up to 5.2 mg $cm^{-2}$. A slurry was prepared by mixing SVPA microparticles, Super P, c-MWCNTs, and PVDF in NMP at a mass ratio of 60:20:10:10 respectively. The slurry was applied to Teflon-coated carbon paper using a doctor blading technique, dried at 50° C. for 12 hours, and then further vacuum dried at 40° C. overnight to manufacture an electrode. The dried electrode was rolled by a roll press and cut using a disk cutter (MTI). 1M LiTFSI and 0.2M $LiNO_3$ in DOL:DME (1:1 vol %) was used as an electrolyte.

The battery was manufactured in two types (a coin cell and a pouch cell), and fabricated in a glove box in a high-purity argon atmosphere using a lithium foil, Celgard 2400 separator, and a fabricated cathode (prepared in a 15 mm disk in case of the coin cell; and a 2 cm×8 cm dimension in case of the pouch cell).

Test Example 1. Battery Performance Test

A constant current charge/discharge test and a cyclic voltammetry experiment were performed using a battery cycler (WBCS3000, Wonatech) with a potential window of 1.7 to 2.7 V. The lithium-ion diffusion coefficient was calculated using the Randles-Sevcik equation.

$$i = (2.69 \times 10^5) n^{3/2} ACD^{1/2} v^{1/2} \quad \text{Randles-Sevcik equation}$$

The redox kinetics of a lithium-sulfur battery was confirmed by the galvanostatic intermittent titration technique (GITT). For driving, a current pulse of 0.05 C was applied for 10 minutes, and subsequently a cycle of resting for 40 minutes was repeated to collect data. Potentiostatic electrochemical impedance spectroscopy (PEIS) experiments were collected by applying an AC voltage of 10 mV to a potentiostat (VersaSTAT3, Princeton Applied Research) in a frequency range of $10^{-1}$ to $10^5$ Hz. In-situ galvanostatic electrochemical impedance spectroscopy (GEIS, VSP-300, BioLogic) allowed the experiment to be performed by simultaneously connecting two different channels to one battery cell. At this time, one channel perturbed an AC current of 0.1 mA in a frequency range of $10^{-1}$ Hz to $10^5$ kHz, and the other channel applied a constant current at a rate of 1 C to collect data.

Evaluation of Binding Energy and Binding Distance

A VPA structure of the SVPA microparticles plays an important role in chemically immobilizing lithium polysulfide. FIG. 5A is UV-vis spectra of the $Li_2S_6$ solution before and after injecting the SVPA microparticles, absorption between 400 nm and 700 nm was reduced when the SVPA microparticles were added to the $Li_2S_6$ solution, and as shown in the inset, color of the solution changed immediately from yellow to colorless. As a result of checking the binding energy to $Li_2S_8$ through density function theory (DFT) calculation, the binding energy of the conventionally used DIB monomer to $Li_2S_8$ was calculated to be 0.69 eV and the binding distance thereof was calculated to be 2.54 Å, whereas the binding energy of VPA to $Li_2S_8$ was calculated to be 2.08. eV and the binding distance thereof was calculated to be 1.76 Å so that it was confirmed that the binding energy was increased three times, and the binding distance was shortened.

Intermolecular Interactions

Intermolecular interactions between the SVPA microparticles and lithium polysulfide were confirmed. Specifically, after decolorization of the $Li_2S_6$ solution, the SVPA microparticles of FIG. 5A were washed with a dioxolane/dimethyl ethane (1:1) mixed solution, and dried to photograph FT-IR spectra. The photographed FT-IR spectra were compared with FT-IR spectra of pure SVPA microparticles as a comparative example, and this is shown in FIG. 5B.

In the SVPA microparticles to which lithium polysulfide immobilized, new peaks were checked at 842 $cm^{-1}$ and 811 $cm^{-1}$, and redshift occurred at 1,280 $cm^{-1}$ and 1,265 $cm^{-1}$. These changes are caused by the Li . . . O=P interaction. Moreover, the P—OH bond became blue-shifted while strength is being enhanced due to the electron donor effect resulting from the interaction with lithium polysulfide. The inserted molecular model shows that lengths of the P=O bond and the P—O bond have been changed due to the interaction between VPA and lithium polysulfide through DFT calculations.

FIG. 5C schematically depicts the hierarchically aligned morphology and chemical confinement of the SVPA microparticles. The reaction between VPA and sulfur radicals results in voids and wrinkled surfaces, and different crystalline forms of covalently linked sulfur and physically supported sulfur lead to a spontaneous nanoscale level of self-assembly. This unique morphology was obtained by rapid one-pot synthesis without requiring other additional components such as solvents, or surfactants.

The easy accessibility of the electrolyte is secured through pores connected to each other of the SVPA microparticles according to the present disclosure, and the SVPA microparticles have a reduced mechanical stress due to low-density sulfur allotropes in the SVPA structure. Besides, VPA moieties located on the pore surface may effectively immobilize lithium polysulfide, thereby enabling the shuttle effect to be mitigated. These advantages remarkably improve the battery performance of the lithium-sulfur batteries.

A lithium-sulfur battery using the SVPA electrode according to the present disclosure does not require the process of additionally impregnating sulfur in preparing the active material due to its high sulfur content. FIG. 5D shows representative constant current discharge/charge voltage curves of a lithium-sulfur battery fabricated with an SVPA cathode, and exhibits high discharge capacities of 1,529 mAh·$g^{-1}$ and 1,366 mAh·$g^{-1}$ at 0.05 C and 0.1 C respectively.

FIG. 5E shows the rate test results, and the lithium-sulfur battery (red spot) using the SVPA microparticles as a cathode material exhibited discharge capacities of 1,190 mAh·$g^{-1}$ (0.5 C), 1,114 mAh·$g^{-1}$ (1 C), 1,003 mAh·$g^{-1}$ (2C), 822 mAh·$g^{-1}$ (5 C), and 721 mAh·$g^{-1}$ (7 C), and a high reversible capacity of 1,188 mAh·$g^{-1}$ was obtained at an additional 0.5 C recovery cycle. The capacity reduction in a negligible level of recovery cycle as described above means a reversible redox reaction. Further, a low level of polarization occurred even in repeated cycles at a fast rate, and the voltage difference between the two flat sections was maintained for a long time. These are in sharp contrast to low discharge capacities of 971 mAh·$g^{-1}$ (0.5 C), 855 mAh·$g^{-1}$ (1 C), 723 mAh·$g^{-1}$ (2C), 272 mAh·$g^{-1}$ (5 C), and 151 mAh·$g^{-1}$ (7 C) of a general sulfur electrode-based battery (black spot) used as a control. In particular, the general sulfur electrode-based battery had a sharp decrease in capacity when the rate was increased from 2 C to 5 C, which is a behavior commonly observed in sulfur electrodes with slow redox kinetics due to low electrical/ionic conductivity.

A Nyquist analysis was performed through EIS of the lithium-sulfur battery, and this is shown in FIG. 6. GITT and In-situ GEIS experiments further demonstrate that there is a fast transition between lithium polysulfide in the liquid state and $Li_2S_2/Li_2S$ in the solid state at the SVPA electrode (open circuit voltage; OCV, closed circuit voltage; CCV). Referring to FIGS. 6A to 6D, the SVPA electrode according to the present disclosure shows effective shuttle effect suppression and fast kinetics in the second discharge flat region (2.05 V), and as a result, it may be seen that lithium polysulfide accumulation in the electrolyte is prevented. In particular, the internal resistance in the liquid-solid transition was noticeably reduced in the SVPA electrode so that the transition activation energy was significantly reduced.

Further, FIG. 11 is a TGA curve (FIG. 11A) of phosphonated graphite and pristine graphite, a time-current curve (FIG. 11B) measured through a constant voltage discharge experiment at 2.05 V of a battery composed of a phosphonated graphite electrode and lithium, and a time-current curve (FIG. 11C) measured through a constant voltage discharge experiment at 2.05 V of a battery composed of a graphite electrode and lithium [0.2M $Li_2S_8$ catholyte is used in both FIG. 11B and FIG. 11C].

Referring to FIGS. 11A to 11C, this is due to the catalytic effect of the phosphonate groups present in the SVPA microparticles, and it was confirmed by measuring the capacity discharged as a $Li_2S_8$ reduction electrode solution (catholyte) was nucleated into $Li_2S$ at 2.05 V by a constant voltage experiment.

Further, FIG. 12 is a lithium-ion diffusion coefficient (FIG. 12A) as a function of discharge voltage and a Warburg coefficient ($\sigma W$) (FIG. 12B) of electrode extracted from low-frequency region (inset) of electrochemical impedance spectroscopy (EIS)[Red shows the results obtained with the SVPA electrode].

The rapid redox kinetics of SVPA for the lithium-sulfur batteries may be quantified via lithium-ion diffusion coefficients. First, the lithium-ion diffusion coefficients depending on discharge voltages confirmed through the GITT experiment are calculated through the following equation.

$$D_{Li} = \frac{4}{\pi\tau}\left(\frac{n_m v_m}{s}\right)^2\left(\frac{\Delta E_s}{\Delta E_t}\right)^2 \quad (1)$$

where τ refers to the duration of the current pulse time, nm refers to the mole number of an electrode active material, $V_m$ refers to the molar volume of the active material, S refers to the contact area, and $\Delta E_s$ refers to the steady-state voltage change, and $\Delta E_t$ refers to the voltage change during τ respectively. As confirmed in FIG. 12A, it was confirmed that the SVPA electrode had double-digit faster lithium diffusion kinetics than the sulfur electrode.

The fast lithium diffusion in SVPA may also be confirmed by measuring EIS, thereby analyzing the low frequency range. As shown in FIG. 12B, a lithium-ion diffusion coefficient value ($D_{Li}$) of the electrode in which 300 cycles were carried out may be obtained from the following two equations.

$$D_{Li} = 0.5\left(\frac{RT}{An^2F^2C\sigma_w}\right)^2 \quad (2)$$

$$Z' = R_e + R_{ct} + \sigma_w\omega^{-0.5} \quad (3)$$

where R refers to the gas constant, T refers to the temperature, A refers to the surface area of the electrode, n refers to the number of electrons transferred, F refers to the Faraday constant, C refers to the concentration of $Li^+$ ions, σw refers to the Warburg coefficient, $R_e$ refers to the electrolyte resistance, and $R_{ct}$ refers to the charge transfer resistance respectively. σw which is entered into these equations is calculated through linear regression analysis of Z' according to respective angular frequencies ($\omega^{-0.5}$), and representative data of the SVPA electrode are included in the inset. It is confirmed that the calculated $D_{Li}$ value ($6.21 \times 10^{-9}$ $cm^2 \cdot s^{-1}$) of the SVPA electrode shows a value that is about 60 times higher than that ($1.08 \times 10^{-10}$ $cm^2 \cdot s^{-1}$) of the sulfur electrode.

The above-mentioned advantages show long lifespan characteristics even at various rates. FIG. 7A is a long-term cycle lifespan test result of a lithium-sulfur battery obtained by rotating the cell for 500 cycles under a current of 4 C, and shows an initial capacity of 922 $mAh \cdot g^{-1}$, and a discharge capacity of 732 $mAh \cdot g^{-1}$ at the 500th cycle. This shows a capacity retention rate of about 80%, a capacity reduction rate of 0.046% per cycle, and a high coulombic efficiency together. FIG. 7B is a Nyquist analysis result of EIS spectra of a lithium-sulfur battery using the SVPA electrode according to the present disclosure obtained by rotating the cell for 500 cycles under a current of 4 C, and has shown that the electrolyte resistance ($R_e$) exhibits a low change of 1.2Ω even after 500 cycles. Moreover, the lithium-sulfur battery using the SVPA electrode according to the present disclosure exhibited high discharge capacity even at a lower current, and showed capacity retention rates of 92.4% and 92.5% with discharge capacities of 874 $mAh \cdot g^{-1}$ and 774 $mAh \cdot g^{-1}$ respectively after 300 cycles at 2 C and 3 C. Meanwhile, the lithium-sulfur battery made with the sulfur cathode showed a capacity reduction from 328 $mAh \cdot g^{-1}$ to 53 $mAh \cdot g^{-1}$ after 500 cycles, thereby showing a low capacity retention rate of 16% level and a rapid capacity reduction of 0.365% per cycle. These results prove the superiority of the lithium-sulfur battery using the SVPA electrode according to the present disclosure.

In order to confirm whether the battery according to the present disclosure is effective in increasing the energy density of the lithium-sulfur battery, the battery performance of the SVAP electrode according to the loading amounts of various active materials was tested. FIG. 7C shows that when it was tested at a rate of 0.1 C under a high cathode active material loading amount of 5.2 $mg \cdot cm^{-2}$, a high specific capacity of 1,000 $mAh \cdot g^{-1}$ or more and a high areal capacity of up to 5 $mAh\ cm^{-2}$ level were confirmed. These results show the superiority of the lithium-sulfur battery using the SVPA electrode of the present disclosure compared to the lithium-sulfur battery using the vulcanized polymer according to the conventional art, and this is due to a unique hierarchically aligned morphology of the SVPA microparticles.

The SVPA microparticles have both micron-sized pores and mesopores due to a high surface area, thereby enabling electrolytes to be easily penetrated and enabling rapid lithium transport depending on the abundant VPA coordination position. FIG. 8 is results of checking the forms of the SVPA electrode by disassembling the lithium-sulfur battery after the charge/discharge cycle, and it may be confirmed that the morphology of the porous particles was preserved even after the battery cycle.

FIG. 13 is cross-section morphology SEM images, surface morphology SEM images, and element mapping images of an SVPA electrode fabricated with a sulfur mass loading of 3.2 $mgs \cdot cm^{-2}$, and is the case of before the cycle (FIG. 13A), the case in which the discharge is performed only up to the beginning of the second discharge plateau voltage (FIG. 13B), and the case in which both charging and discharging are fully performed (FIG. 13C).

Specifically, referring to FIG. 13A, it may be confirmed that the circular SVPA microparticles are transformed into an oval shape while forming a coating layer with a thickness of about 60 μm during the electrode fabrication process. The particles became to be able to withstand deformation due to the properties of SVPA which is chemically cross-linked and has many pores, and this is quite different from sulfur, which is well deformed (brittle). Further, referring to FIG. 12A, as a result of checking the morphology of the SVPA electrode after discharging until the beginning of the second discharge plateau voltage, it may be confirmed that the porous SVPA framework is maintained in the state that it is not damaged even after most of sulfur is dissolved. Further, referring to FIG. 12C, it may be confirmed that the circular SVPA microparticles were well maintained even after a complete charge/discharge cycle.

FIG. 14 shows C 1s XPS spectra (FIGS. 14A and 14B) and O 1s XPS spectra (FIGS. 14C and 14D) before and after the cycle of the SVPA electrode. At this time, the integral ratios of $CF_2$ peak: C—P peak: C—S peak and P—O—P peak: P—OH peak: P=O peak, which are rarely changed before and after the cycle, are shown. FIGS. 14E and 14F are X-ray powder diffraction (XRD) patterns before and after cycling of a battery using a $CS_2$-etched SVPA electrode.

Post-mortem analysis of the SVPA electrode which had completed the battery cycle was carried out using XPS and XRD. Specifically, referring to FIG. 14, the chemical stability of the VPA structure during the battery cycle was proved from that the integral ratio of the P—OH and P=O bonds before and after the cycle in the XPS O 1s spectra of the SPVA electrode had not changed significantly. This may be said to be due to the low deprotonation degree of VPA (pKa of VPA: 2.74). The fact that the integral ratio for PVDF binder, C—P bond, and C—S bond was rarely changed before and after the battery cycle proves that the molecular structure of SVPA is maintained even after repeated solid-liquid change conversion reactions. Further, XRD experiments confirmed that α-sulfur was regenerated to a negligible level while maintaining a ω-sulfur phase in the SVPA electrode in which cycling was carried out.

Considering that the SVPA framework has a porosity of 56% as well as that the α-sulfur phase has a lower density than α-sulfur, the actual density of the SVPA framework is expected to be quite low. Therefore, it is judged that the SVPA electrode is advantageous in alleviating the volume change that may be accompanied through the repeated reaction (lithiation/delithiation) of sulfur and lithium.

FIG. 9 is a graph comparing rate capabilities, maximum specific capacity values, and areal capacities of the vulcanized polymer-based lithium-sulfur battery reported to date. It may be seen that the lithium-sulfur battery using the SVPA electrode according to the present disclosure exhibits excellent performance compared to the conventionally developed lithium-sulfur battery.

Driving Characteristics Under Harsh Environment

The SVPA electrode according to the present disclosure may be manufactured by a simple press method, and the flexible battery test was evaluated by combining it with a lithium foil anode and fabricating a pouch-type lithium-sulfur battery. FIG. 10A is an open circuit voltage (OCV) result of the pouch-type lithium-sulfur battery according to the present disclosure measured at various radii of curvature (Rb), and shows a very stable OCV value at about 2.29 V regardless of a change in radii of curvature (from 15 mm to 3 mm). It may be confirmed from FIG. 10B that it did not undergo a significant change in the constant current discharge voltage curve even in a form in which the pouch-type lithium-sulfur battery according to the present disclosure is bent to a radius of curvature of 3 mm (the inset shows that the SVPA flexible electrode is wound to a radius of curvature of 3 mm around the glass rod). FIG. 10C shows that a test on if it operated stably even under severe deformation was performed under a red LED lamp. The driven brightness of the capital letter "P" remained as it was even when the cell was folded or crumpled, suggesting that the internal circuitry was well connected even under various strains. These results show that the lithium-sulfur battery using the SVPA electrode of the present disclosure is usefully applicable to the application of flexible wearable electronic devices.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A cathode active material for a secondary battery comprising a poly(S-co-VPA) vulcanized polymer;
   wherein the poly(S-co-VPA) vulcanized polymer comprises one or more moieties selected from the following Chemical Formulas SVPA1 and SVPA2 within a molecular structure,
   the poly(S-co-VPA) vulcanized polymer has a three-dimensional porous network formed throughout the particles thereof, and
   the three-dimensional porous network further contains sulfur allotropes physically supported within pores:

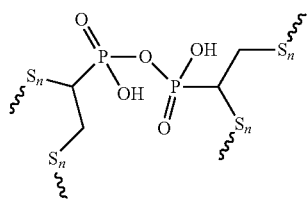

[SVPA1]

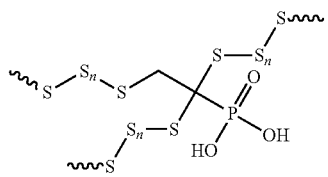

[SVPA2]

In formula, ⌇⌇⌇ represents a bonding position, and n is an integer between 1 and 20.

2. The cathode active material for the secondary battery of claim 1, wherein the vulcanized polymer is an inverse vulcanized polymer.

3. The cathode active material for the secondary battery of claim 1, wherein the poly(S-co-VPA) vulcanized polymer is spherical particles having a diameter of 50 to 800 microns.

4. The cathode active material for the secondary battery of claim 1, wherein the cathode active material for the secondary battery comprises 80% to 95% by weight of sulfur with respect to 100% by weight of the total cathode active material for the secondary battery.

5. The cathode active material for the secondary battery of claim 1, wherein the poly(S-co-VPA) vulcanized polymer comprises 40 to 70% by weight of sulfur and 30 to 60% by weight of vinylphosphonic acid (VPA).

6. The cathode active material for the secondary battery of claim 1, wherein the secondary battery is a lithium-sulfur secondary battery.

7. A lithium-sulfur battery comprising the cathode active material for the secondary battery according to claim 1.

8. The lithium-sulfur battery of claim 7, wherein vinylphosphonic acid in the cathode active material chemically immobilizes lithium polysulfide within the lithium-sulfur battery.

* * * * *